(12) United States Patent
Tapio et al.

(10) Patent No.: US 7,337,159 B2
(45) Date of Patent: Feb. 26, 2008

(54) SYSTEM AND METHOD FOR SHARING OF EXPERT KNOWLEDGE

(75) Inventors: Thomas H. Tapio, Deerfield, IL (US); Clifford Wagner, Chicago, IL (US); Daniel M. Schramm, Chicago, IL (US)

(73) Assignee: Topiary Communications, Inc., Chicago, IL (US)

( * ) Notice: Subject to any disclaimer, the term of this patent is extended or adjusted under 35 U.S.C. 154(b) by 140 days.

(21) Appl. No.: 11/298,358

(22) Filed: Dec. 8, 2005

(65) Prior Publication Data

US 2006/0112055 A1    May 25, 2006

Related U.S. Application Data

(63) Continuation-in-part of application No. 09/678,428, filed on Oct. 2, 2000, now Pat. No. 6,985,889.

(60) Provisional application No. 60/156,838, filed on Sep. 30, 1999.

(51) Int. Cl.
*G06F 17/00* (2006.01)
*G06N 5/00* (2006.01)
*G06N 5/02* (2006.01)

(52) U.S. Cl. .......................... 706/45; 706/46
(58) Field of Classification Search ............... None
See application file for complete search history.

(56) References Cited

U.S. PATENT DOCUMENTS

| | | | |
|---|---|---|---|
| 4,658,370 A | 4/1987 | Erman et al. |
| 4,731,725 A | 3/1988 | Suto et al. |
| 4,733,354 A | 3/1988 | Potter et al. |
| 4,764,867 A | 8/1988 | Hess |
| 4,803,641 A | 2/1989 | Hardy et al. |
| 4,847,784 A | 7/1989 | Clancey |
| 4,920,499 A | 4/1990 | Skeirik |
| 4,945,476 A | 7/1990 | Bodick et al. |
| 4,964,125 A | 10/1990 | Kim |
| 5,103,498 A | 4/1992 | Lanier et al. |
| 5,107,497 A | 4/1992 | Lirov et al. |
| 5,127,005 A | 6/1992 | Oda et al. |
| 5,208,745 A | 5/1993 | Quentin et al. |
| 5,211,563 A | 5/1993 | Haga et al. |
| 5,257,185 A | 10/1993 | Farley et al. |

(Continued)

FOREIGN PATENT DOCUMENTS

EP    0 915 422 A1    5/1999

OTHER PUBLICATIONS

Kelemen, A. et al., "Elastic model-based segmentation of 3-D neuroradiological data sets," *Medical Imaging, IEEE Transactions*, Oct. 1999, pp. 828-839, vol. 18, Issue 10.

(Continued)

*Primary Examiner*—Michael B. Holmes
(74) *Attorney, Agent, or Firm*—Neal, Gerber & Eisenberg LLP; James P. Muraff

(57) ABSTRACT

The present invention provides a system and method of creating electronic files for solving a problem for a learner from the knowledge of an expert, comprising the steps of receiving the expert's knowledge in an area of expertise, providing a template for the electronic files and generating the electronic files from the expert's knowledge and the template.

20 Claims, 35 Drawing Sheets

U.S. PATENT DOCUMENTS

| | | |
|---|---|---|
| 5,267,685 A | 12/1993 | Sorensen |
| 5,295,230 A | 3/1994 | Kung |
| 5,311,422 A | 5/1994 | Loftin et al. |
| 5,333,237 A | 7/1994 | Stefanopoulos et al. |
| 5,344,326 A | 9/1994 | Ferris |
| 5,359,701 A | 10/1994 | Fukui et al. |
| 5,441,415 A | 8/1995 | Lee et al. |
| 5,539,869 A | 7/1996 | Spoto et al. |
| 5,546,507 A | 8/1996 | Staub |
| 5,576,844 A | 11/1996 | Anderson et al. |
| 5,577,186 A | 11/1996 | Mann, II et al. |
| 5,644,686 A | 7/1997 | Hekmatpour |
| 5,673,369 A | 9/1997 | Kim |
| 5,696,885 A | 12/1997 | Hekmatpour |
| 5,788,508 A | 8/1998 | Lee et al. |
| 5,799,292 A | 8/1998 | Hekmatpour |
| 5,806,056 A | 9/1998 | Hekmatpour |
| 5,835,683 A | 11/1998 | Corella et al. |
| 5,870,768 A | 2/1999 | Hekmatpour |
| 5,947,747 A | 9/1999 | Walker et al. |
| 5,987,443 A | 11/1999 | Nichols et al. |
| 6,018,731 A | 1/2000 | Bertrand et al. |
| 6,026,433 A | 2/2000 | D'Arlach et al. |
| 6,029,159 A | 2/2000 | Zorba et al. |
| 6,064,998 A | 5/2000 | Zbloudil et al. |
| 6,128,655 A | 10/2000 | Fields et al. |
| 6,985,889 B1 * | 1/2006 | Tapio et al. ............... 706/45 |

OTHER PUBLICATIONS

Montgomery, C.A. et al., "The DBG message understanding system," *AI Systems in Government Conference, Proceedings of the Annual*, Mar. 27-31, 1989, pp. 258-265.

Kyungseob Yoon et al., "Authoring system for the development of ITS," *TENCON '94, IEEE Region 10's Ninth Annual International Conference, Theme: 'Frontiers of Computer Technology,' Proceedings of*, Aug. 22-26, 1994, pp. 97-101.

Isard, A. et al., "Speaking the users' languages," *Intelligent Systems, IEEE [see also IEEE Intelligent Systems and Their Applications*, Jan.-Feb. 2003, pp. 40-45, vol. 18, Issue 1.

* cited by examiner

FIG. 16

Question Dialog - Also Hooking

Question
- Question Name: Also Hooking
- Question Abbr: Also Hooking
- Instruction Text: Determine if your shots are hooking:
- Question Text: Are your well-hit shots hooking to your left?

Responses
- Response Text:
- [Insert] [Replace] [Remove]
- Responses: No / Yes / Not Sure
- Video: 
- Text:

[Delete] [Save] [Cancel]

FIG. 17

Rule - Slicing Grip

Identifiers
- Rule Number: 011020
- Rule Name: Slicing Grip

Rule Description
- Question:    [Questions...]
- Relation:
- Response:
- Logic:
- [Insert] [Replace] [Remove]

| Question: | Relation: | Response: | Logic: |
|---|---|---|---|
| Start on Target | Equal to | Yes | And |
| Long Shots Worst | Equal to | Yes | And |
| Height of Flight | Equal to | High | Then |

Solution
- Solution Name: Slicing Grip    [Solutions...]

[Delete] [Save] [Cancel]

Rules Master List

Title Name: Personal Pro
Subject Name: Full Swing (FS)

| Question Name | Relationship Operator | Reponse | Logic |
|---|---|---|---|
| Rule: | 005010    Hooking Low Upright | | |
| Solution Name: | Low Upright | | |
| Solution Description: | Solution for Hitting Low, Thin, or Hooking: Swing Straighter and Around | | |
| Start on Target | Equal to | Yes | Or |
| Start Right | Equal to | Yes | And |
| Height of Flight | Equal to | Low | And |
| Occasionally Push | Equal to | Yes | And |
| Tee Shots Best | Equal to | Yes | And |
| Iron Shots Thin | Equal to | Yes | Or |
| Frequency Hit Fat | Equal to | Sometimes | Or |
| Frequency Hit Fat | Equal to | Frequently | Then |
| Rule: | 005015    Hooking Slicing Posture | | |
| Solution Name: | Slicing Posture | | |
| Solution Description: | Solution for Slicing, Hooking, or Hitting Fat or Thin: More Upright Posture | | |
| Start on Target | Equal to | Yes | And |
| Iron Shots Thin | Equal to | Yes | Or |
| Frequency Hit Fat | Equal to | Sometimes | Or |
| Frequency Hit Fat | Equal to | Frequently | Then |
| Rule: | 005030    Hooking Forward Pushing | | |
| Solution Name: | Hooking Forward | | |
| Solution Description: | Solution for Hooking, Hitting Low, or Pushing: Move Ball Forward | | |
| Start Right | Equal to | Yes | And |
| Pushing Short Irons | Equal to | Yes | Or |
| Occasionally Push | Equal to | Yes | And |
| Height of Flight | Equal to | Low | Or |
| Height of Flight | Equal to | Medium | Then |

FIG. 24

Question Dialogs Master List
Title Name: Personal Pro
Subject Name: Full Swing (FS)

| | Image Name | Text Name |
|---|---|---|
| Responses | | |
| | Question Name: Also Hooking | Question Abbreviation: Also Hooking |
| | Question Instruction: Determine if your shots are hooking: | |
| | Question Text: Are your well-hit shots hooking to your left? | |
| No | | |
| Yes | | |
| Not Sure | | |
| | Question Name: Frequency Hit Fat | Question Abbreviation: Frequency Hit Fat |
| | Question Instruction: Observe how often you hit the ball fat: | |
| | Question Text: How often do you hit the ground behind the ball, hitting it fat? | |
| Almost Never | | |
| Sometimes | | |
| Frequently | | |
| Not Sure | | |
| | Question Name: Handicap Rating | Question Abbreviation: Handicap Rating |
| | Question Instruction: Estimate your handicap rating: | |
| | Question Text: What is your handicap rating for eighteen holes? | |
| Zero to Two | | |
| Three to Four | | |
| Five to Six | | |
| Seven to Eight | | |
| Nine to Eleven | | |
| Twelve to Fifteen | | |
| Sixteen to Twenty | | |
| Twenty-One or Over | | |
| Not Sure | | |
| | Question Name: Height of Flight | Question Abbreviation: Height of Flight |
| | Question Instruction: Observe the height of your full shots: | |
| | Question Text: How high do your full shots usually fly? | |
| Low | | |

ID: mstrqst

FIG. 25

| | | | |
|---|---|---|---|
| 10/9/2003 9:11:23PM | Rule Objects for Home Page | | Page 1 |
| | Site Name: Sample Retirement Site | | |
| | Home Page: 02.10.10 Retirement Home Page | | |

| Question | Relation | Response | Logic |
|---|---|---|---|
| Rule - [R04.10.01.00 Rul0 101] | | | |
| Q08 Compensation | Equal to | E 53.1 0-24,999 | Or |
| Q08 Compensation | Equal to | E 53.2 25,000-49,999 | Or |
| Q08 Compensation | Equal to | E 53.3 50,000-79,999 | And |
| Q06 Marital | Equal to | E 48.1 Single | Or |
| Q06 Marital | Equal to | E 48.3 Divorced | And |
| Q07 Rollover | Equal to | A2 No | Then |
| Linked To: Solution Page | 04.10.00.01 | Savings Salary Less Than 80000 Single | |
| Rule - [R04.10.01.01 Rul1 101] | | | |
| Q08 Compensation | Equal to | E 53.1 0-24,999 | Or |
| Q08 Compensation | Equal to | E 53.2 25,000-49,999 | Or |
| Q08 Compensation | Equal to | E 53.3 50,000-79,999 | And |
| Q06 Marital | Equal to | E 48.2 Married | And |
| Q07 Rollover | Equal to | A2 No | Then |
| Linked To: Solution Page | 04.10.00.02 | Savings Salary Less Than 80000 Married | |
| Rule - [R04.10.01.010 Rul10 101] | | | |
| Q08 Compensation | Equal to | E 53.4 80,000-99,999 | Or |
| Q08 Compensation | Equal to | E 53.5 100,000-159,999 | And |
| Q06 Marital | Not Equal to | E 48.2 Married | And |
| Q07 Rollover | Equal to | A1 Yes | Then |

Interview - Rules Chart

Unable to find the results you were looking for?

Previous 100  Next 100  Total combinations: 240

| No | Company | Work | Age | Union Member | Status of Enrollment | Link |
|---|---|---|---|---|---|---|
| 101 | Subsidiary B | 6 months - 3 years | 21-39 | Yes | First Time Enrollment | Txt_NotEligible_8.html |
| 102 | Subsidiary B | 6 months - 3 years | 21-39 | Yes | Left and Now Rehired | Txt_NotEligible_8.html |
| 103 | Subsidiary B | 6 months - 3 years | 21-39 | No | First Time Enrollment | Sol_FirstTime_97.html |
| 104 | Subsidiary B | 6 months - 3 years | 21-39 | No | Left and Now Rehired | Sol_2ndTime_98.html |
| 105 | Subsidiary B | 6 months - 3 years | 40-64 | Yes | First Time Enrollment | Txt_NotEligible_8.html |
| 106 | Subsidiary B | 6 months - 3 years | 40-64 | Yes | Left and Now Rehired | Txt_NotEligible_8.html |
| 107 | Subsidiary B | 6 months - 3 years | 40-64 | No | First Time Enrollment | Sol_FirstTime_97.html |
| 108 | Subsidiary B | 6 months - 3 years | 40-64 | No | Left and Now Rehired | Sol_2ndTime_98.html |
| 109 | Subsidiary B | 6 months - 3 years | 65+ | Yes | First Time Enrollment | Txt_NotEligible_8.html |
| 110 | Subsidiary B | 6 months - 3 years | 65+ | Yes | Left and Now Rehired | Txt_NotEligible_8.html |
| 111 | Subsidiary B | 6 months - 3 years | 65+ | No | First Time Enrollment | Sol_FirstTime_97.html |
| 112 | Subsidiary B | 6 months - 3 years | 65+ | No | Left and Now Rehired | Sol_2ndTime_98.html |
| 113 | Subsidiary B | 4 - 10 years | 17-20 | Yes | First Time Enrollment | Txt_NotEligible_8.html |
| 114 | Subsidiary B | 4 - 10 years | 17-20 | Yes | Left and Now Rehired | Txt_NotEligible_8.html |
| 115 | Subsidiary B | 4 - 10 years | 17-20 | No | First Time Enrollment | Txt_NotEligible_8.html |
| 116 | Subsidiary B | 4 - 10 years | 17-20 | No | Left and Now Rehired | Txt_NotEligible_8.html |
| 117 | Subsidiary B | 4 - 10 years | 21-39 | Yes | First Time Enrollment | Txt_NotEligible_8.html |

FIG. 42

SYSTEM AND METHOD FOR SHARING OF EXPERT KNOWLEDGE

CROSS-REFERENCE TO RELATED APPLICATIONS

The present application is a continuation-in-part of U.S. Patent Application entitled "System and Method for Sharing of Expert Knowledge," Ser. No. 09/678,428, filed Oct. 2, 2000, now U.S. Pat. No. 6,985,889 the contents of which are expressly incorporated herein by reference; which claims priority of U.S. Provisional Application Ser. No. 60/156,838, filed Sep. 30, 1999, the contents of which are expressly incorporated herein by reference.

APPENDIX

The attached Appendix I is a part of the present specification and is hereby incorporated into the application by reference.

TECHNICAL FIELD

The present invention relates to the field of computer software. More particularly, the present invention relates to a system which enables an expert to easily share the expert's knowledge electronically without having an understanding of the technical system by which the knowledge is being shared.

BACKGROUND OF THE INVENTION

In the past, experts in many different areas have been unable to quickly and easily share their knowledge electronically with others. This is because the expert also had to be an expert in the medium by which the files are shared. Specifically, to publish complicated hierarchies of documents on the world wide web, such as documents which ask a series of questions to diagnose a problem, one had to be an expert in web technology. The complexity and time-consuming nature of publishing knowledge electronically have prevented much knowledge from being shared electronically or, at least, have prevented it from being shared with any easily navigated structure.

In order to solve this problem the present invention automates the process of creating hierarchical structures of electronic documents. The hierarchical structure allows the knowledge to be presented to a learner in an interesting and easily navigated way. Other features and advantages of the invention will be apparent from the following detailed description taken in conjunction with the drawings.

The present invention is provided to solve the problems discussed above and other problems, and to provide advantages and aspects not provided by prior * of this type. A full discussion of the features and advantages of the present invention is deferred to the following detailed description, which proceeds with reference to the accompanying drawings.

SUMMARY OF THE INVENTION

The present invention provides a system and method of creating electronic files for solving a problem for a learner from the knowledge of an expert comprising the steps of receiving the expert's knowledge in an area of expertise, providing a template for the electronic files and generating the electronic files from the expert's knowledge and the template.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 16 is a display of a question parameter window in accordance with an embodiment of the present invention;

FIG. 17 is a display of a rule parameter window in accordance with an embodiment of the present invention;

FIG. 24 is a report of the contents of the database in accordance with an embodiment of the present invention; and, FIG. 25 is a report of the contents of the database in accordance with an embodiment of the present invention.

FIG. 37 is a rules object list portion of automatically generated documentation for a user interface prepared in accordance with an embodiment of the present invention.

FIG. 40 is a default item properties list portion of automatically generated documentation for a user interface prepared in accordance with an embodiment of the present invention.

FIG. 42 is a rules chart portion of automatically generated documentation for a user interface prepared in accordance with an embodiment of the present invention.

DETAILED DESCRIPTION

Figure 1:
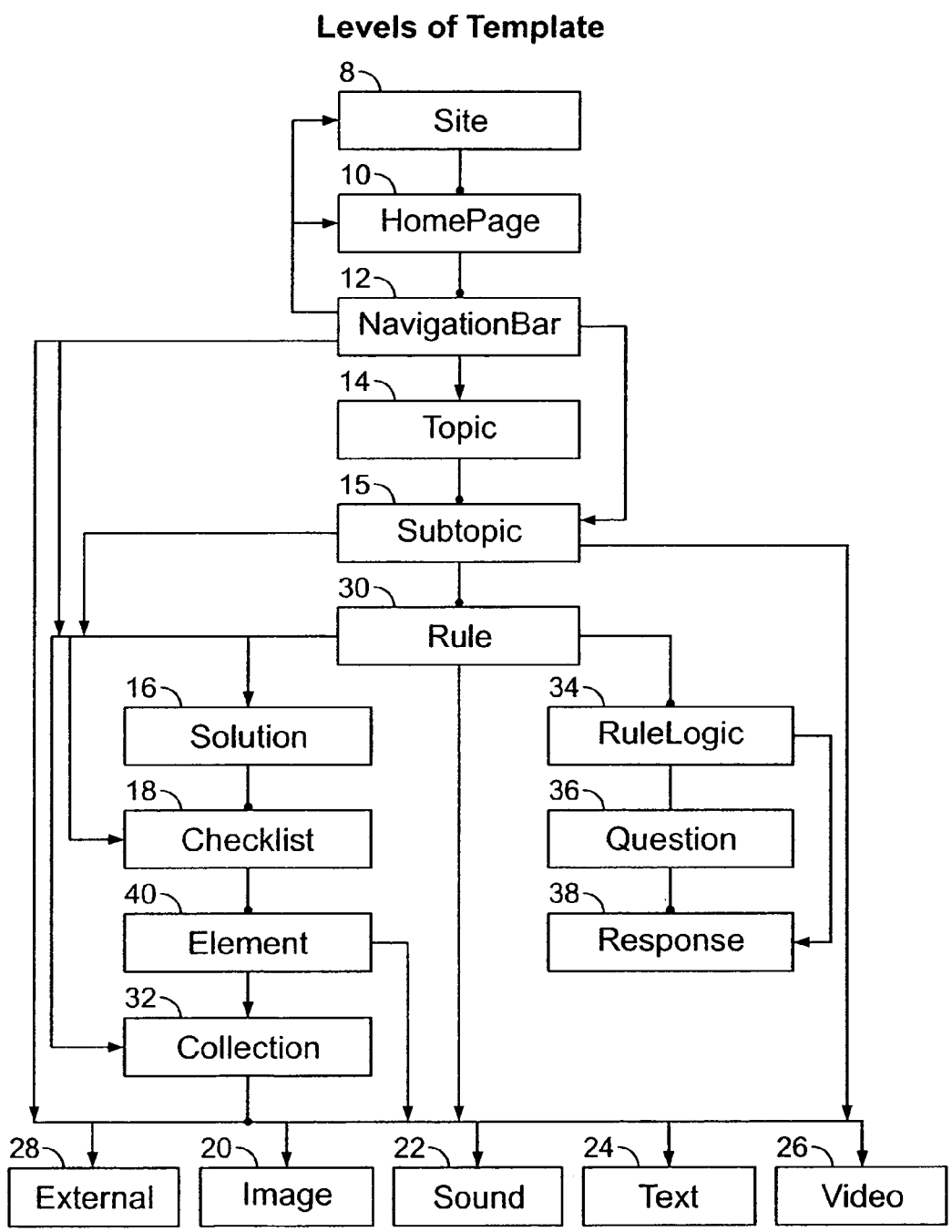
FIG. 1 is a diagram of a template in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a system and method by which experts in a particular field of knowledge can easily and quickly share their knowledge with others electronically. The system simplifies the process for publishing electronic information by not requiring the expert to have detailed knowledge about the system by which the information is published. In the present embodiment of the invention, the knowledge is provided from an expert to a learner by allowing the learner to diagnose a problem the learner is trying to solve by answering questions about the problem. In this manner the learner is taught the solution to the problem to be solved. By answering questions associated with a particular problem, the learner eventually answers enough questions that the solution can be determined. When the proper solution to the learner's problem is determined, the learner is provided with text, images, hyperlinks, video and/or audio, which provide an explanation of each step of the solution to the learner.

The process of the present invention is based upon the idea of using prefabricated code templates as the driving input. Additionally, the invention utilizes descriptions of assets and controls (explained below) that are stored in a database. During the generation process, the template and the descriptions in the database are automatically integrated into the final output. In its preferred embodiment, the present invention generates applications that result in hypertext markup language ("HTML") and Javascript source code. This creates a World Wide Web look and feel. However, various output formats could be implemented without departing from the principles of the present invention. As such, the present invention should not be limited to HTML and Javascript source code.

In the presently preferred embodiment, the interface for a learner to interact with the present invention is an internet browser which accesses files written in HTML and Javascript. As shown in FIG. 1, the HTML files are generated from a template 2 which incorporates knowledge supplied by the expert. The template 2 comprises a site 8, a home page 10 and a navigation bar 12. The navigation bar 12 can link the learner to topics 14, subtopics 15, solutions 16, checklists 18, or collections 32 of multimedia assets. The multimedia assets may be images 20, sound 22, text 24, video 26 or any combination thereof. The multimedia asset can also be a link to multimedia provided from an external source 28. The present list of multimedia assets is representative rather than comprehensive and can include other technologies such as communication with a live person.

In FIG. 1, relationship between items is shown by a line with an arrowhead or a line with a circle. Items connected by a line with an arrowhead show a relationship between two distinct items. Items connected by a line with a circle indicate a relationship between an item and a second item which is representative of a group of such items.

A learner can also use the navigation bar 12 to navigate to the home page 10 and the site 8. The home page 10 is the highest level of a particular application, i.e. the highest level of a particular area of expertise. The site 8 contains many home pages 10 which represent many areas of expertise.

Topics 14 contain different concepts to be addressed within an area of expertise. Additionally, as indicated by the line and circle relationship of the topic 14 and subtopics 15, topics 14 may have more than one subtopic 15. Subtopics 15 are associated with rules 30, solutions 16, checklists 18 and collections 32. Rules 30 are associated with solutions 16, checklists 18, collections 32, and rulelogics 34. Rulelogics 34 are associated with a question 36 and a response 38. Checklists are associated with elements 40.

Figure 2:
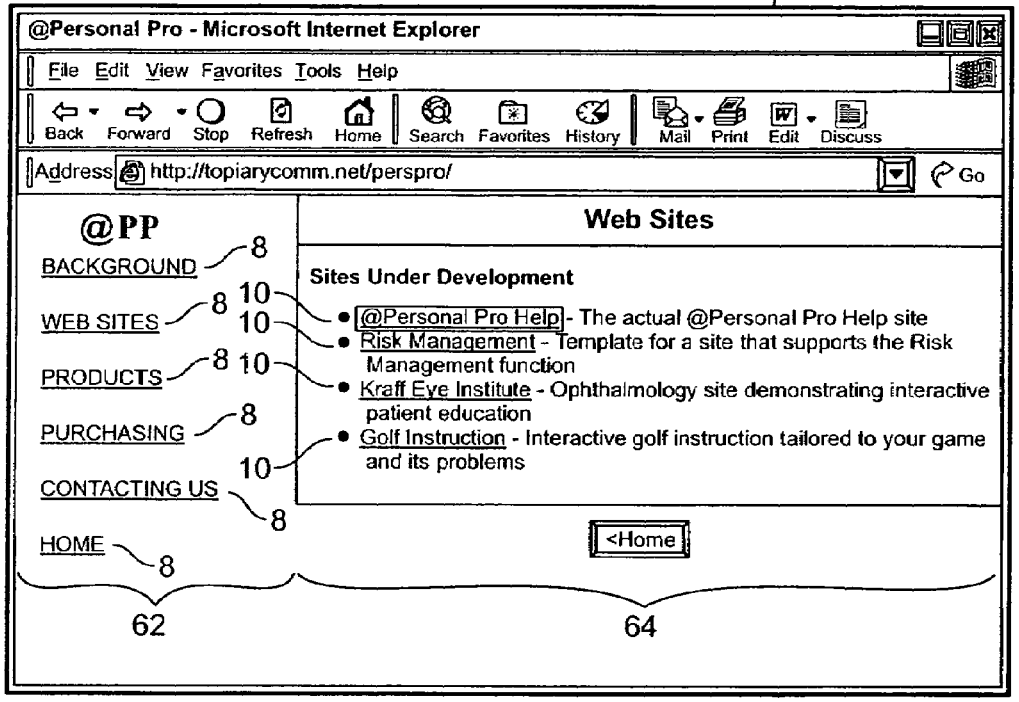
FIG. 2 is a display of a generated HTML file in accordance with an embodiment of the present invention.

By using HTML files which implement the template 2 of FIG. 1, learners can diagnose a problem in order to find a solution. Referring to FIG. 2, the previously discussed concepts will be described by way of example. FIG. 2 provides a web browser 60 with a left pane 62 which displays a navigation bar 12 and right pane 64 which displays a site 8. The site 8 contains links to several home pages 10, and the navigation bar can contain links to other sites 8.

Figure 3:
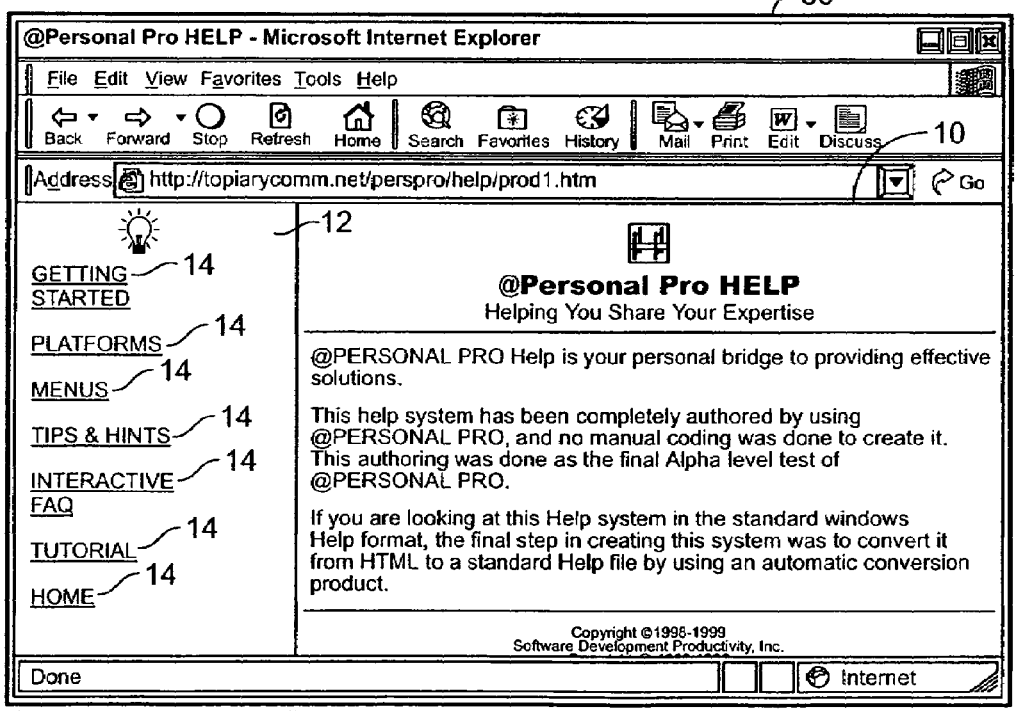
FIG. 3 is a display of a generated HTML file in accordance with an embodiment of the present invention.

By clicking on the home page 10 "@Personal Pro Help" the browser changes to show the navigation bar 12 in the left pane 62 which displays links to topics 14 and displays a homepage 10 associated with the "@Personal Pro" link, as in FIG. 3.

Figure 4:
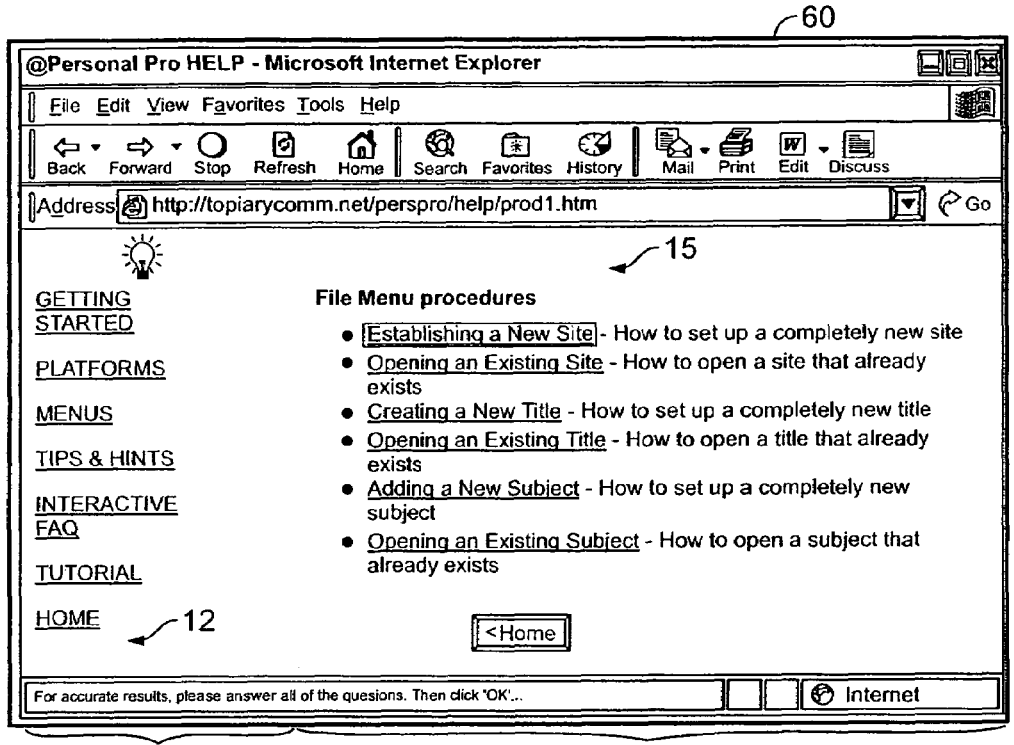
FIG. 4 is a display of a generated HTML file in accordance with an embodiment of the present invention.

By clicking on the topic 14 "Interactive FAQ," the left pane 62 continues to show the topics of FIG. 3, but the right pane 64 changes to show the subtopics 15 associated with the chosen topic 14, as in FIG. 4.

Figure 5:
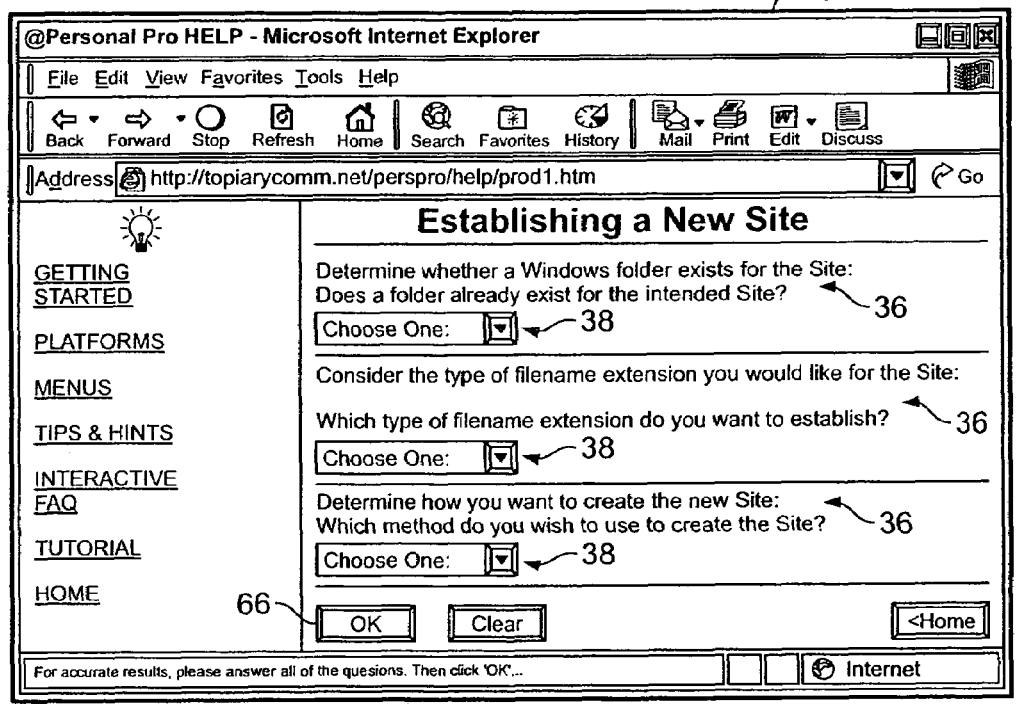
FIG. 5 is a display of a generated HTML file in accordance with an embodiment of the present invention.

By clicking on "Establishing a New Site," which in this case links to a subtopic 15, the left pane 62 continues to display the navigation bar 12 while the right pane 64 displays the question 36 and responses 38, as shown in FIG. 5.

Figure 6:
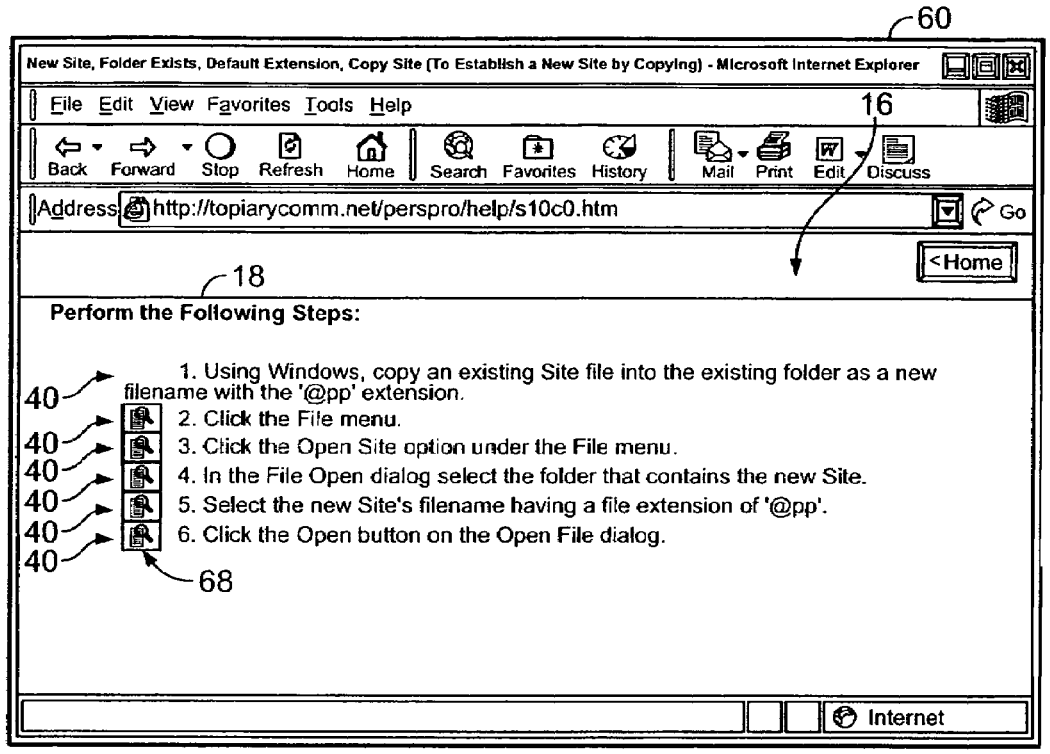
FIG. 6 is a display of a generated HTML file in accordance with an embodiment of the present invention.

After the learner has selected proper responses 38 to the questions 36 and clicks an OK button 66, the rule is executed and the web browser 60 changes to display a solution 16 determined by the rulelogic associated with the rule, as in FIG. 6. The solution 16 comprises a checklist 18 having six elements 40. Associated with elements 60 can be multimedia assets 20, 22, 24, 26, 28 or a collection 32. Collections 32 are simply collections of more than one multimedia asset 20, 22, 24, 26, 28.

Figure 7:
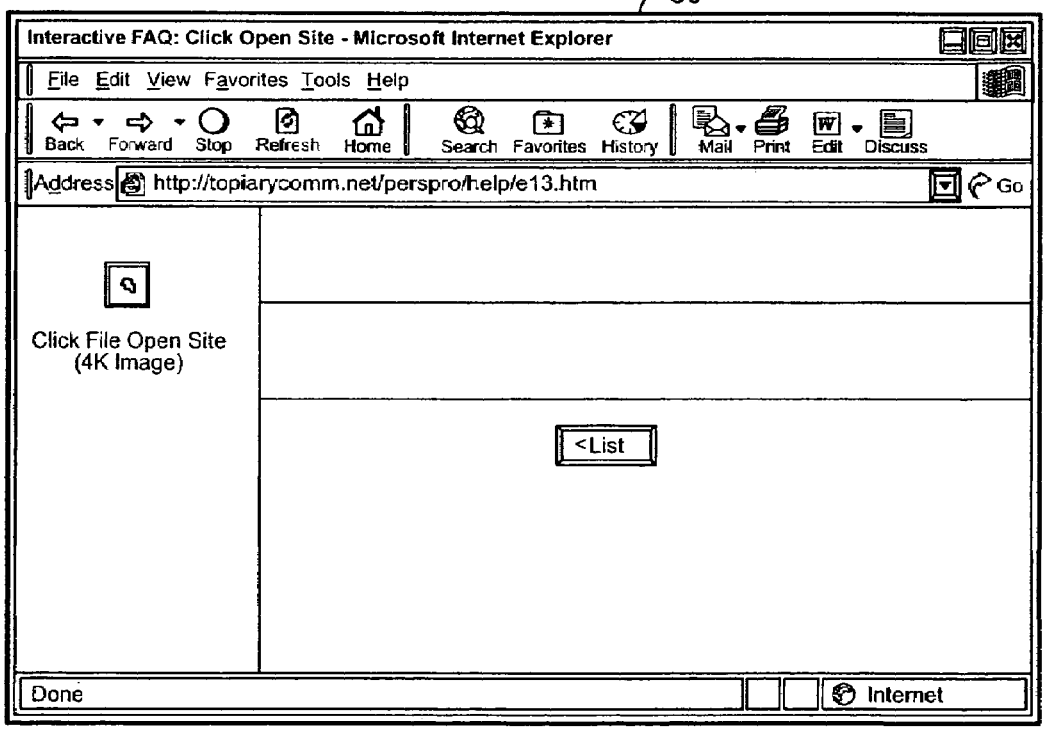
FIG. 7 is a display of a generated HTML file in accordance with an embodiment of the present invention.
Figure 8:
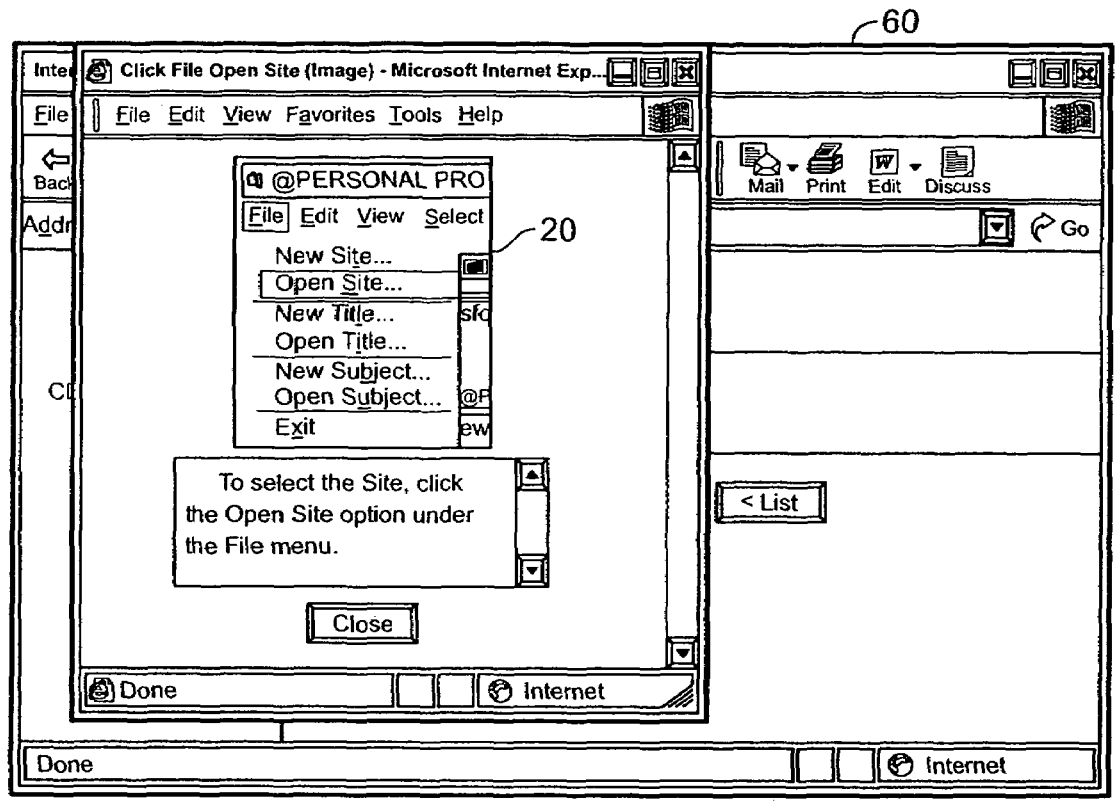
FIG. 8 is a display of a generated HTML file in accordance with an embodiment of the present invention.

By clicking on an indicator 68 next to the element 40, the browser 60 changes to display the asset 20, 22, 24, 26, 28 or collection 32 associated with the element 40, as in FIG. 7. In the case of FIG. 7, an image asset 20 link is shown. By clicking on the image asset 20 link, the image asset 20 is displayed to the learner, as in FIG. 8.

Figure 9:
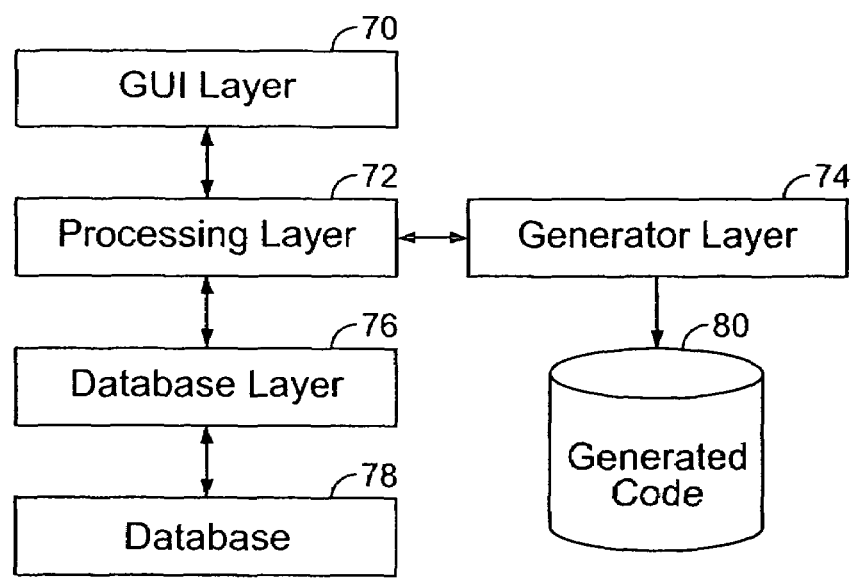
FIG. 9 is a diagram of the hierarchy of an embodiment of the present invention.

Referring to FIG. 9, the present invention uses four distinct layers of processing in order to generate the HTML files from the template 2. The four layers comprise a graphical user interface (GUI) layer 70, a processing layer 72, a generator layer 74 and a database layer 76. Each layer exists as an independent and self-contained object. The GUI layer 70, the generator layer 74, and the database layer 76 each communicate only with and through the processing layer 72. In the preferred embodiment of the present invention, each layer 70-76 operates on a single computer. However, it is contemplated that the four layers 70-76 could be divided among more than one computer in order to distribute processing and utilize geographically remote computers.

The GUI layer's 70 purpose is to prompt input from the expert, pass information to the processing layer 72, and then display updates back to the expert. It communicates with the processing layer 72 to perform validations and other internal processing of the input.

Figure 10:
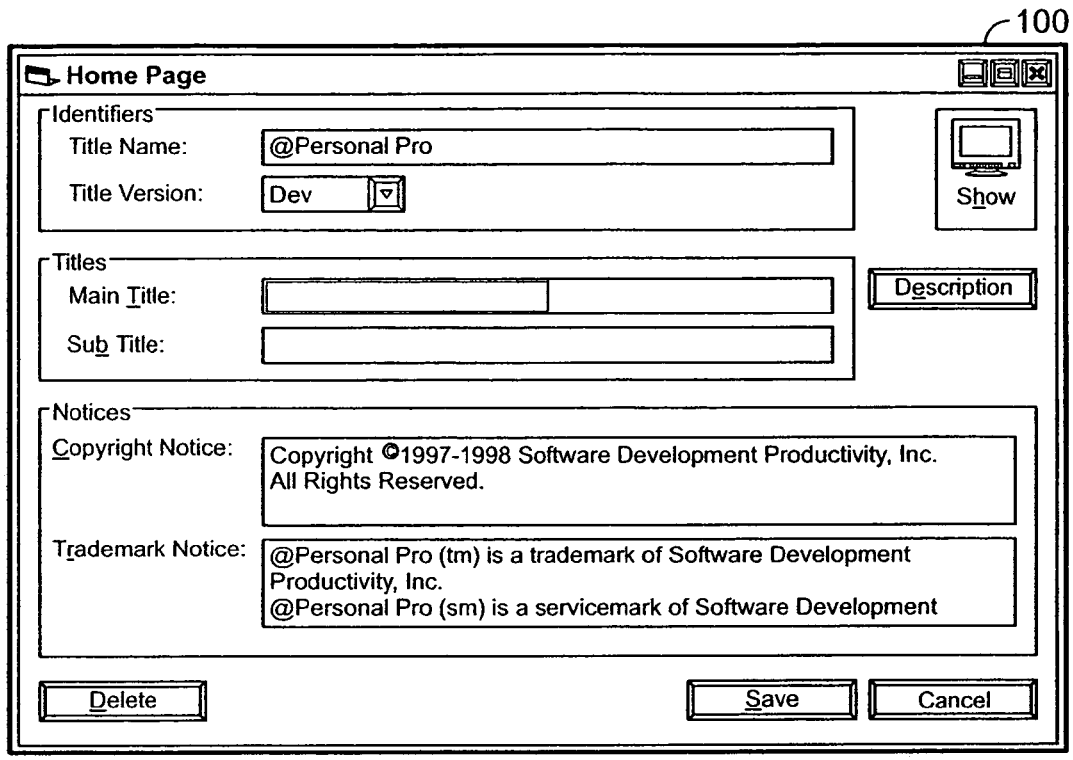
FIG. 10 is a display of a home page parameter window in accordance with an embodiment of the present invention.
Figure 11:
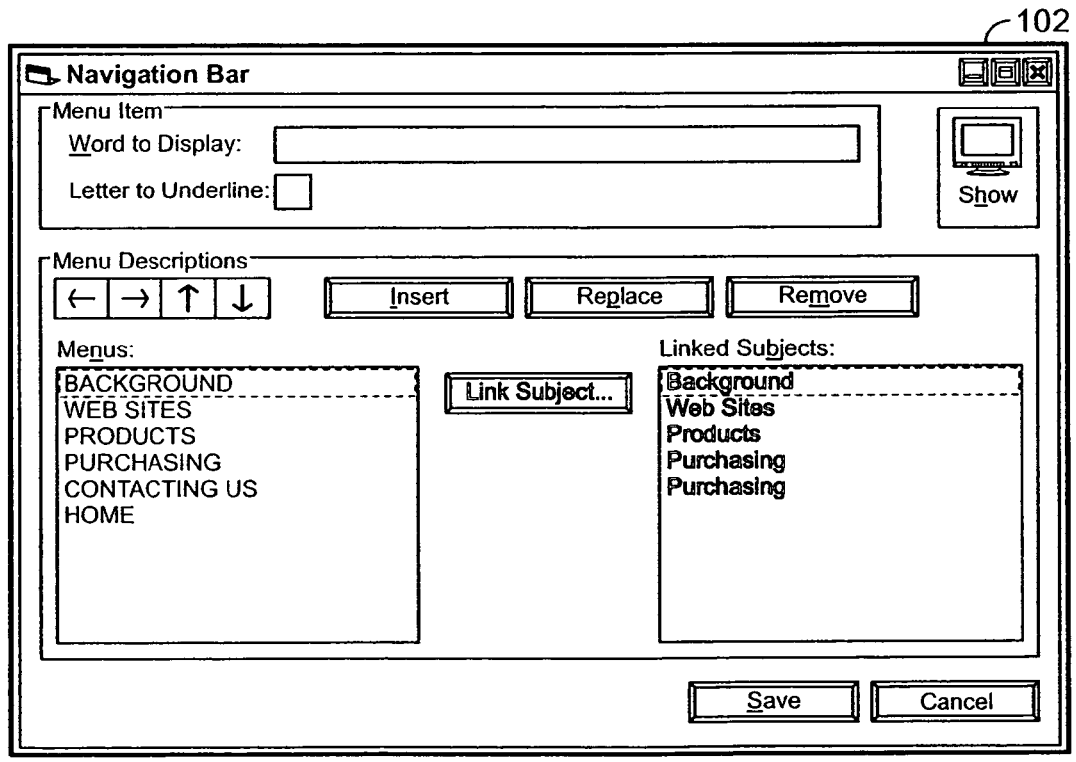
FIG. 11 is a display of a navigation bar parameter window in accordance with an embodiment of the present invention.
Figure 12:
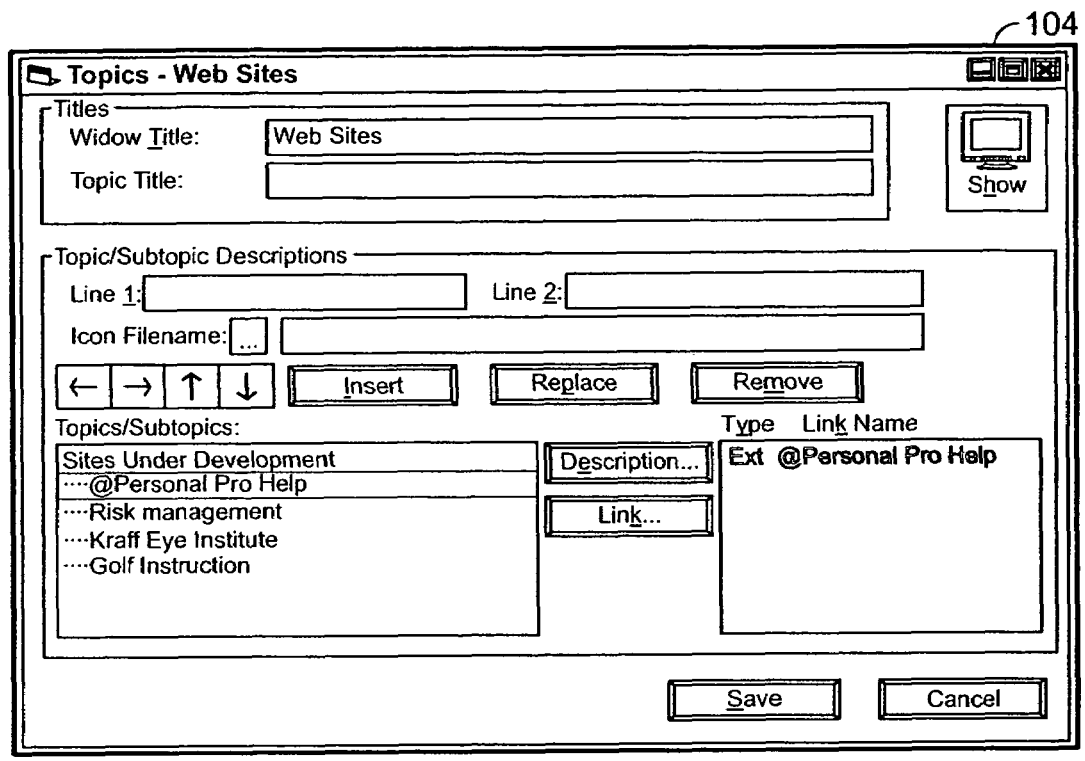
FIG. 12 is a display of a topic parameter window in accordance with an embodiment of the present invention.
Figure 13:
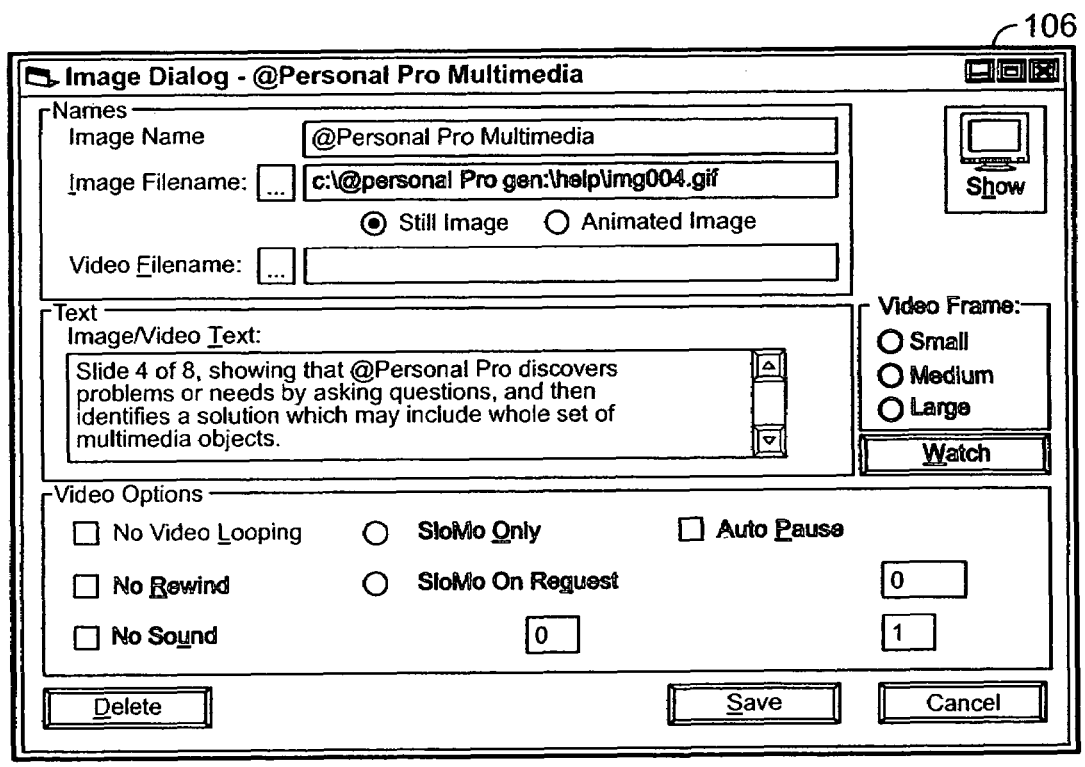
FIG. 13 is a display of an image parameter window in accordance with an embodiment of the present invention.

The GUI layer 70 is the primary interface for enabling the expert to merge knowledge into the template 2. The GUI layer 70 includes multiple dialog boxes which allow the expert to enter parameters for all items associated with the items of the template 2. For example, in FIG. 10, a home page parameter window 100 allows the expert to associate information with a home page including a title name, title version, main title, sub title, copyright notice and trademark notice. In FIG. 11, a navigation bar parameter window 102 allows the expert to associate information with a navigation bar, such as a menu item word to display, a menu item letter to underline, menus and topics to be linked to the menus. In FIG. 12, a topic/subtopic parameter window 104 allows the expert to associate information with topic and subtopics, such as a window title, topic title, line 1 of the topic, line 2 of the topic, icon filename for the topic, a list of topics and subtopics, and a linked item to the topic/subtopic. In FIG. 13, an image or video asset parameter window 106 allows the expert to associate a multimedia asset with the template 2 by allowing the expert to associate an image name, an image filename, still image/animated image radio button, a video filename, an image/video text caption, as well as options related to the type of video used.

Figure 14:
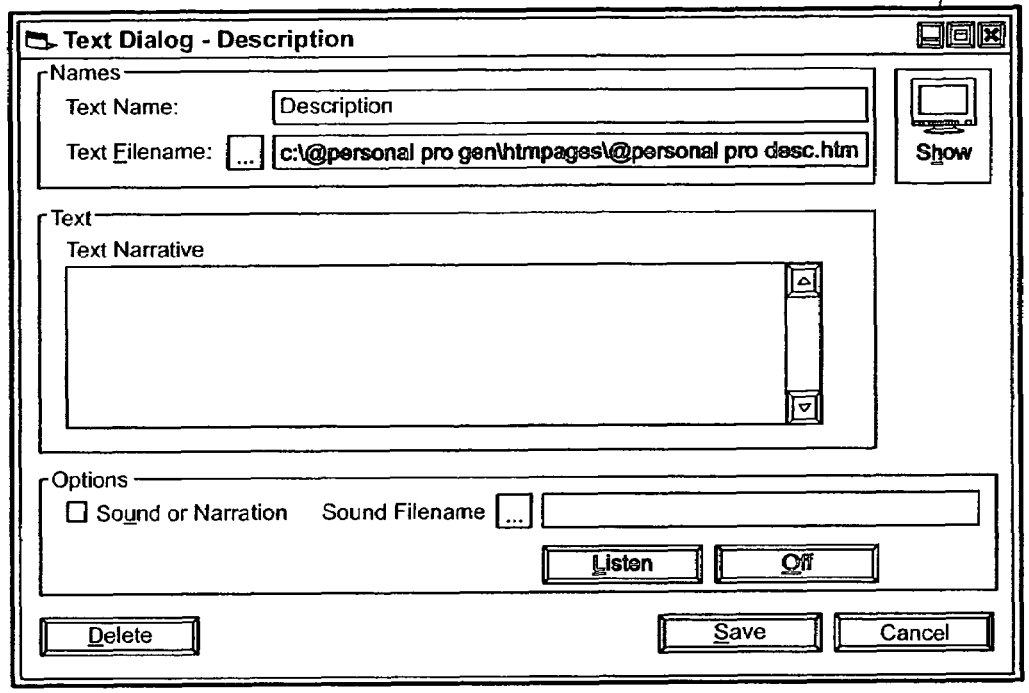
FIG. 14 is a display of a text parameter window in accordance with an embodiment of the present invention.
Figure 15:
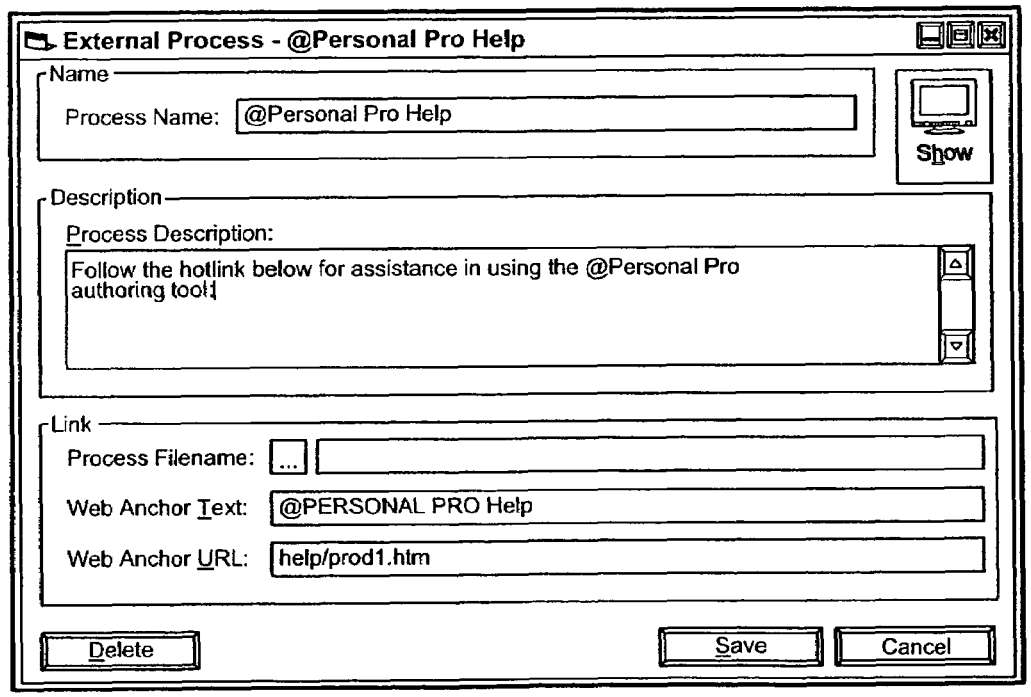
FIG. 15 is a display of a external process parameter window in accordance with an embodiment of the present invention.

In FIG. 14, a text or sound multimedia asset parameter window 108 allows the expert to associate information with a text or sound multimedia asset, such as text name, text filename, text narrative, sound or narration check box, or sound filename. In FIG. 15, an external multimedia type parameter window 110 allows the expert to associate information with an external multimedia asset, such as a process name, process description, process filename, web anchor text, and web anchor URL. In FIG. 16, a question and response parameter window 112 allows the expert to associate information with a question, such as a question name, a question abbreviation, instruction text, question text, response text, and response order.

Figure 18:
FIG. 18 is a display of a solution parameter window in accordance with an embodiment of the present invention.
Figure 19:
FIG. 19 is a display of a checklist parameter window in accordance with an embodiment of the present invention.
Figure 20:
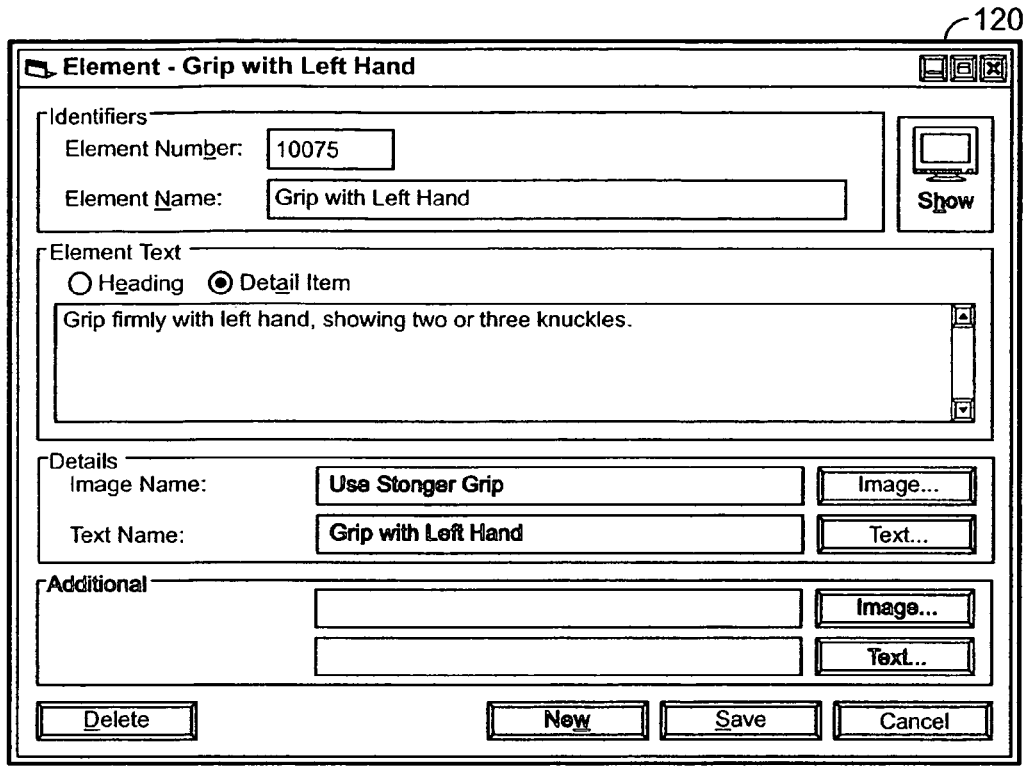
FIG. 20 is a display of an element parameter window in accordance with an embodiment of the present invention.
Figure 21:
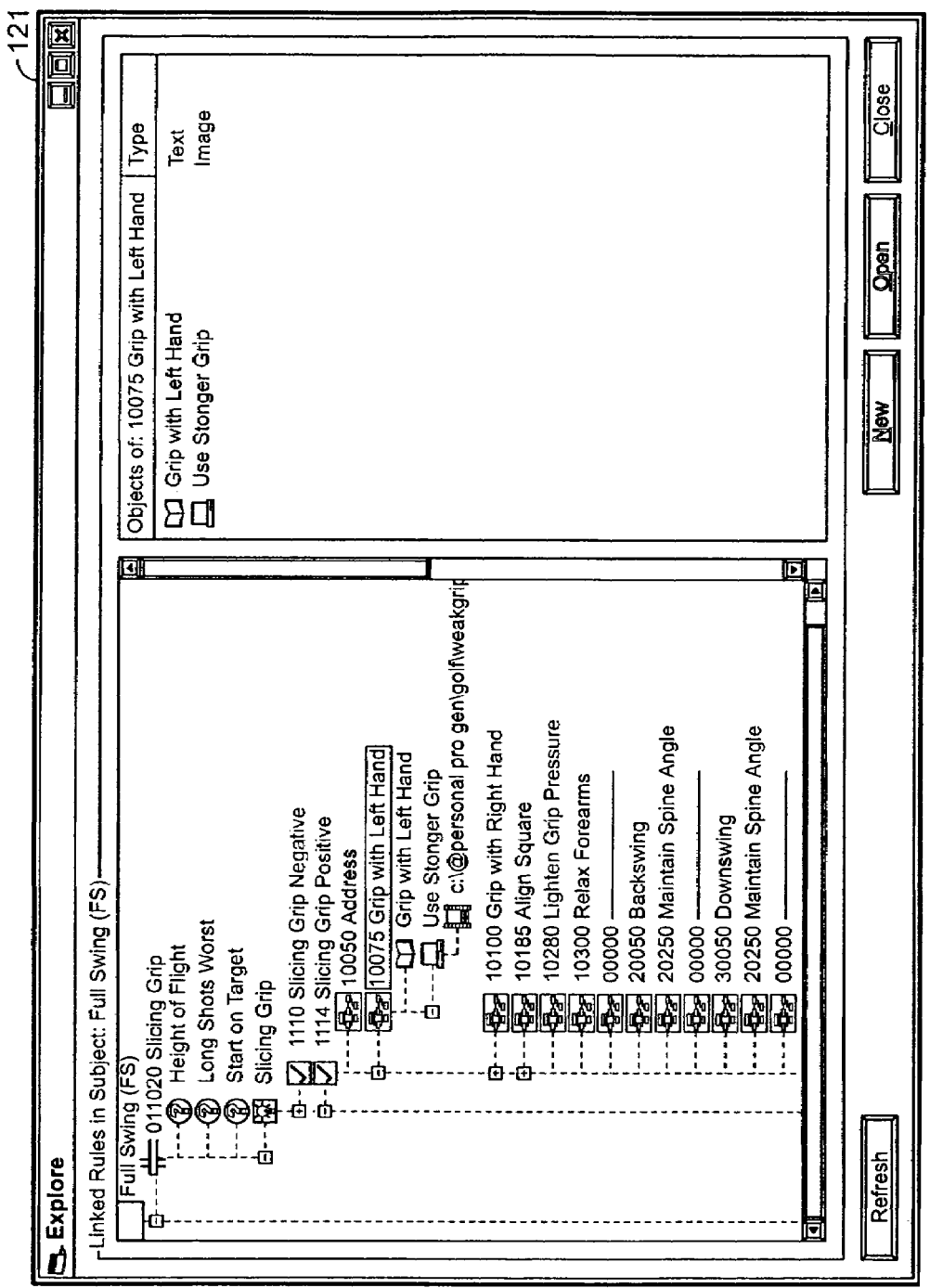
FIG. 21 is a display of a window which shows all of the items in the template in accordance with an embodiment of the present invention.

In FIG. 17, a rule parameter window 114 allows the expert to associate information with a rule, such as a rule number, rule name, a question, a relation, a rule, a rule logic, and a solution name. In FIG. 18, a solution parameter window 116 allows the expert to associate information with a solution, such solution name, solution description, a solution checklist, and a solution presentation style. In FIG. 19, a checklist parameter window 118 allows the expert to associate information with a checklist, such as checklist number, checklist name, checklist description, checklist elements, and checklist element text. In FIG. 20, an element parameter window 120 allows the expert to associate information with an element, such as an element number, an element name, an element text, and element details. In FIG. 21, there is provided a window which shows all items in the template 2 in an explorer-style dialog.

Figure 22:
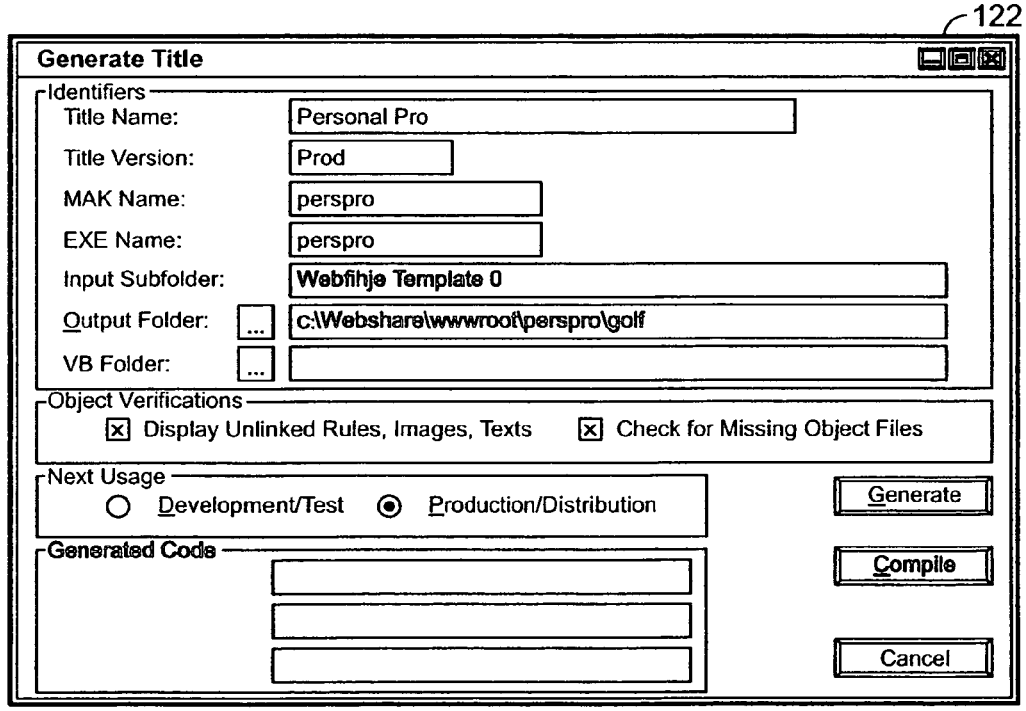
FIG. 22 is a display of a generate window in accordance with an embodiment of the present invention.

In FIG. 22, a generate HTML page window 122 is provided. From this window, an expert may assign a title name, title version, MAK Name, EXE Name, input subfolder, output folder, VB folder, object verifications checkboxes, next usage radio buttons, and a generate command box. When the expert clicks the generate command box, the information provided by the expert through the previously discussed windows is passed to the processing layer 72.

The processing layer 72 receives requests from the GUI layer 70 and the generator layer 74, requests information from a database 78 via the database layer 76, and returns information to the GUI layer 70 and the generator layer 74. It also receives information from the GUI layer 70 and performs validations of data and other internal processing, and inputs the data to the database 78 via the database layer 76.

The generator layer 74 automatically creates the HTML and Javascript files 80. It requests information from the database 78 via the processing layer 72 and the database layer 76, uses template files 2 as additional input, and processes the HTML and Javascript files 80. As the processing begins, the generator determines the template 2 to be used. Each template is processed independently and in turn references a specific asset type whose descriptive information needs to be accessed in the database for that template. At a deeper level, each template also contains control types that call for specific types of source code to be generated at each of their respective locations in the template. Templates also contain references to text files that contain static, common source code that needs to be generated into their locations as well.

At the most detailed level, as the different control types are being generated, their related properties, stored in the control detail database table, determine specific source code instructions to generate. Some examples of these types of properties include font sizes, font styles, alignments, colors, sizes of images, and web page URLs to link to.

Defaults for the properties of the various control types can be defined by the authoring process and stored in the control default database table. The generator responds to the default values by automatically generating cascading style sheets that in turn are referenced by the generated web pages. This creates a consistent look-and-feel for the same control types that may appear in more than one template.

As the code is being generated it is placed in a location indicated by the author's choices stored in the home page directory database table. Also, at the author's option, a history can be maintained of which output files have changed since the previous generation process has been run for that template group.

Figure 23A:
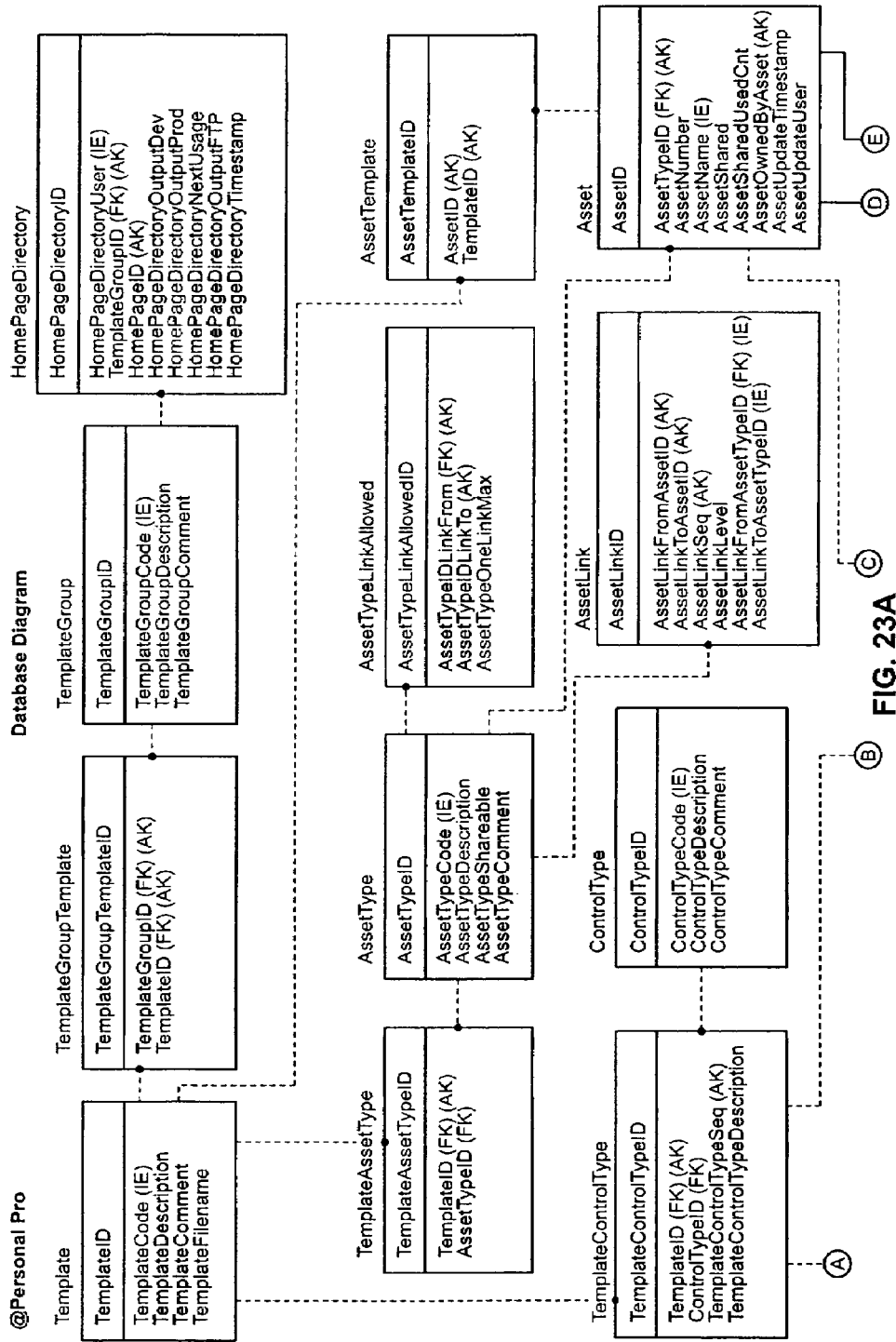
FIG. 23 is a diagram of the database in accordance with an embodiment of the present invention.
Figure 23B:

The database layer 76 interfaces directly with the database. The database typically comprises a database management system, such as Oracle, SQL or Microsoft Access. It receives requests for information, input data and instructions from the processing layer 72. The database layer 76 is the only layer that needs to be aware of the specific database management system being implemented. Referring to FIG. 23, the database is constructed using multiple linked tables, as shown, the construction of such database is shown in Appendix I.

The present invention is capable printing reports to the expert which display the properties of every item within the database. Referring to FIG. 24, there is shown a report for showing all of the rule logic associated with each individual rule. In FIG. 25, there is shown a report showing the questions within the database and the responses associated with each question.

Finally, while the preferred embodiment of the present invention is a locally executed application, it is further contemplated that the GUI layer 70 could be implemented to communicate with an expert via a web page rather than as a locally executed program. In such an embodiment, the layers 70-76, database 78 and HTML files 80 would exist on one or more web servers which communicate with the expert through the Internet and a web browser. Additionally, either embodiment could further implement a step of automatically publishing the HTML files to a web server connected to the Internet.

Figure 26:
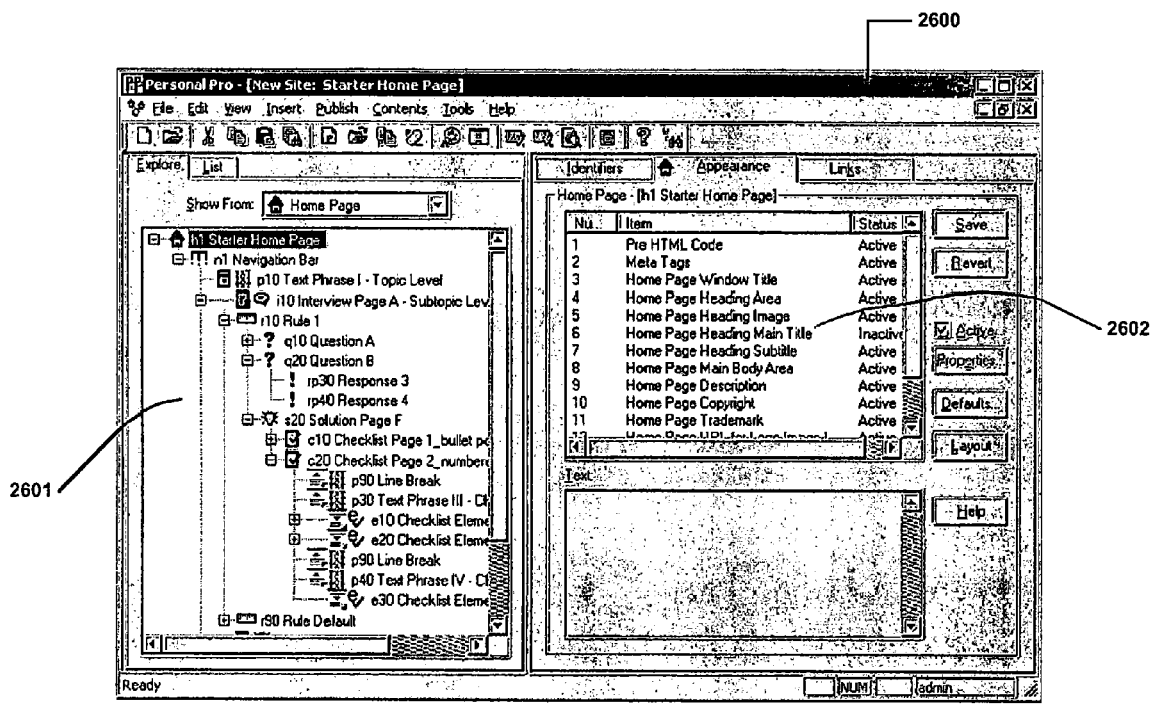
FIG. 26 is an authoring component for use in creating a user interface in accordance with an embodiment the present invention.

Referring now to FIG. 26, there is illustrated an authoring component 2600 for use with the present invention. The authoring component 2600 is an interface that allows an expert to quickly and easily create a prefabricated user interface or template for providing expert knowledge to users of the template. The authoring component 2600 provides a mechanism for the automatic generation of HTML and Javascript files 80, by linking information from the database 78. Template files 2 are selected by the user via the authoring component 2600. Also using the component 2600, the expert can associate those template files 2 with specific asset types 2601. One specific advantage of the authoring component 2600 is that it allows the creator of the HTML page to link a particular asset type 2601, e.g. "Question A", with a specific prefabricated type 2602. The expert can thereby simply provide the raw text for the asset without having to specify the style and format for that asset 2601, because that asset 2601 is associated with a type 2602, which is in turn associated with a prefabricated style and format via the associated HTML code segment.

Figure 27:
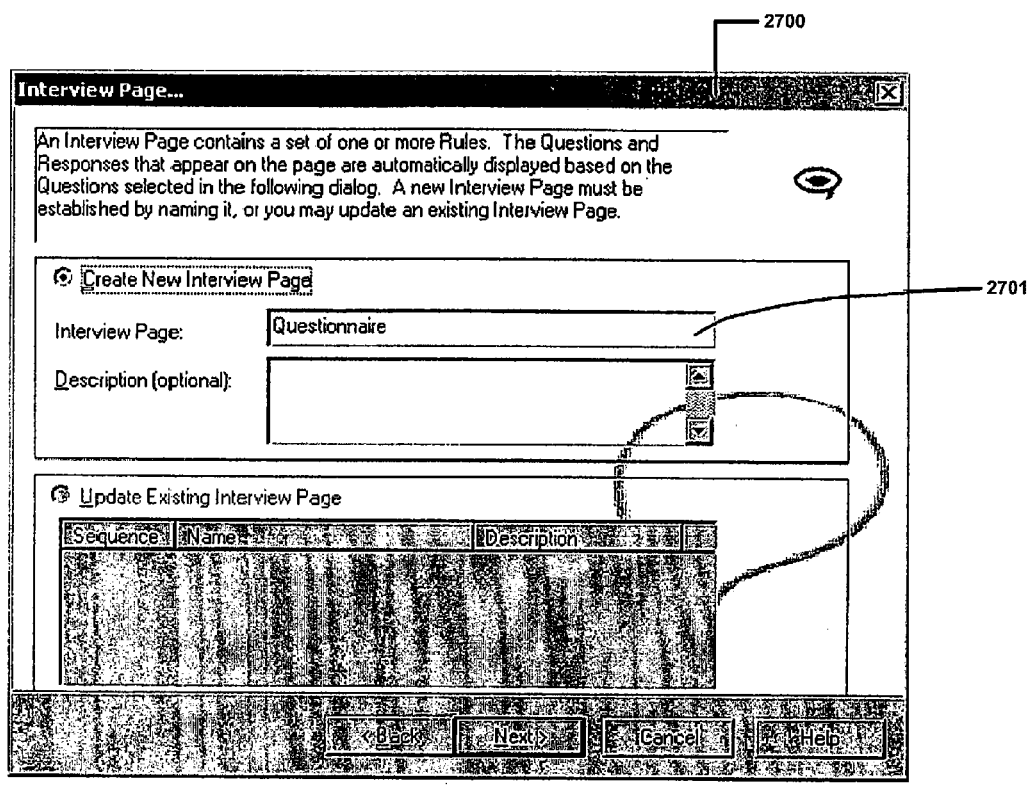
FIG. 27 is an illustration of an authoring wizard for use in creating a user interface in accordance with an embodiment of the present invention.

Referring now to FIG. 27, there is illustrated an authoring wizard 2700 that allows an expert to create a user interface for use with the present invention. The authoring wizard 2700 is a further abstraction of the authoring component 2600, which presents a series of wizard screens to the expert, of which the wizard 2700 illustrated in FIG. 27 is an example. The wizard 2700 is a step-by-step series of questions presented to the expert. The expert answers each of the questions in each of the wizard screens, and then proceeds to the next wizard screen. As illustrated, each question represented in each wizard screen is associated with an asset type 2601, and each answer provided by the expert in each wizard screen provides data that is associated with that asset type. After entering answer data into each of the wizard screens, that data appears associated with the appropriate asset types in the authoring component 2600. The authorizing wizard 2700 thereby provides a step-by-step, user-friendly way for an expert to create a user interface by entering data into the wizard screens without any requisite knowledge of the system or of programming expertise. Using either the authoring component 2600 or the authoring wizard 2700—or a combination thereof—the expert can create an HTML-generated user interface without any knowledge of HTML. The wizard interface is designed so that with each data field 2701 through which the expert is walked, every piece of information input by the expert is designated as a certain type of information describing the asset 2601, a reusable component as described herein. Information describing the asset 2601 includes its general information such as the unique identifying text string, the description of the component, its characteristics for displaying information in the generated code, and its location within the decision tree. Upon completion of the wizard, the system takes all the data entered into the wizard screens and, based on the information placed in the different fields 2701, correlates the information to where the information should be stored within the database system so that it is added to the decision tree. The wizard 2701 allows for the creation of new assets 2601, or the mapping of existing assets 2601 into a new or existing structure so that the expert has an alternate method to create areas of the decision tree, including populating new branches, creating new assets 2601, and linking previously created assets 2601 within the overall map of the site.

Figure 28:
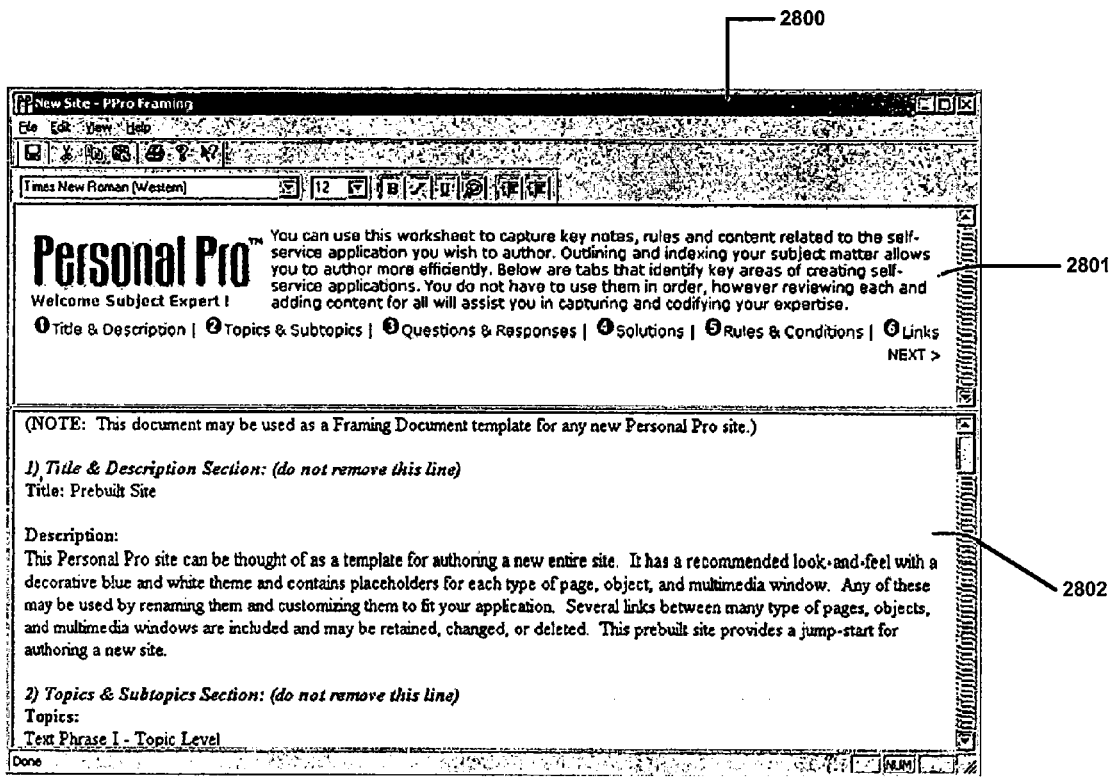
FIG. 28 is an illustration of a framing worksheet for use in creating a user interface in accordance with an embodiment of the present invention.

Referring now to FIG. 28, there is illustrated a frame-based authoring template 2800 for use with the present invention. The frame-based template 2800, i.e. framing worksheet 2800, provides an HTML and Rich Text interface for an expert to create a user interface for entering, receiving and answering questions. In the worksheet 2800, two frames are represented. The first frame is a menu 2801 which allows the expert author to link between various portions of the user interface. The second frame is a content window 2802 that provides step-by-step instructions to the expert author for entering data into the system and also displays the resulting user interface. That latter functionality of the content window 2802 provides the expert author with the opportunity to view the "finished product" of the user interface, to ensure that the data has been entered and formatted appropriately. Upon entering this information, the system takes the information and, based on utilizing an underlying tagging system where each section of text is marked utilizing the industry standard XML markup language, the information that is designated by the author as being the designated name, description, and other identifying information for a new reusable component is correlated to a location within the database where the frame-based template will add a new record to place the information into the decision tree.

The authoring worksheet 2800 is provided in an outline format, whereby the expert author creates various portions of the outline. If an outline term provided by the expert author already exists as an asset type in the system, then the data provided by the expert author becomes associated with that asset type. If the outline term does not already exist as an asset type in the system, then that term is entered into the system as a new asset type. The XML data format structure is used as a template by which expert-provided terms are stored and hierarchically organized for later dynamic retrieval by the system into the user interface. The use of XML structure further provides for the expert-provided data to be dynamically inserted into a user interface of any desired format. For instance, if after the completion of the user interface, it is determined that the visual style and formatting of an asset type should be changed, that change can be made once—in the XML template—and that change will thereafter be reflected in all of the HTML pages reflecting that asset type, without requiring that the desired change be made in each of the HTML pages. The framing worksheet 2800 thereby provides a way to quickly generate, verify and update a user interface for asking and answering expert questions. It will be understood that while XML is the preferred embodiment for storing the data for use by the system, a variety of different data storage formats can be used without departing from the principles of the present invention.

The present invention also provides a way for an expert author to provide answers based on a math logic analysis. For example, the user interface can present three questions to a user, wherein each of the answers to those questions has an associated value. The resultant data provided to the user via the interface can be logically based on the values of the questions, wherein the answer is generated based on math logic analysis provided by the expert author. The math logic analysis that connects questions to each other, and questions to expert answers within the system, is an additional component to "rules," which are defined by the expert author when the user interface is created. Using the authoring tools described herein (e.g., authoring component 2600, authoring wizard 2700 and framing worksheet 2800), the expert author can create, view and adjust the math logic rules that define the relationships between the questions and answers within the system. Based on the math logic, rules can be expanded using the same Boolean logic so that the result of a mathematical computation can be defined as criteria making up a rule. For example, an expert may define that if the response by a user to annual income divided by the number of hours worked per week is less than a predefined amount, such as 20, the user will be given a different solution then a person who has a result to the same question that is greater than. These rules can be linked with other rules so that a single HTML page of user input can generate different responses based on math logic and responses to other independent questions, such as union membership.

Figure 29:
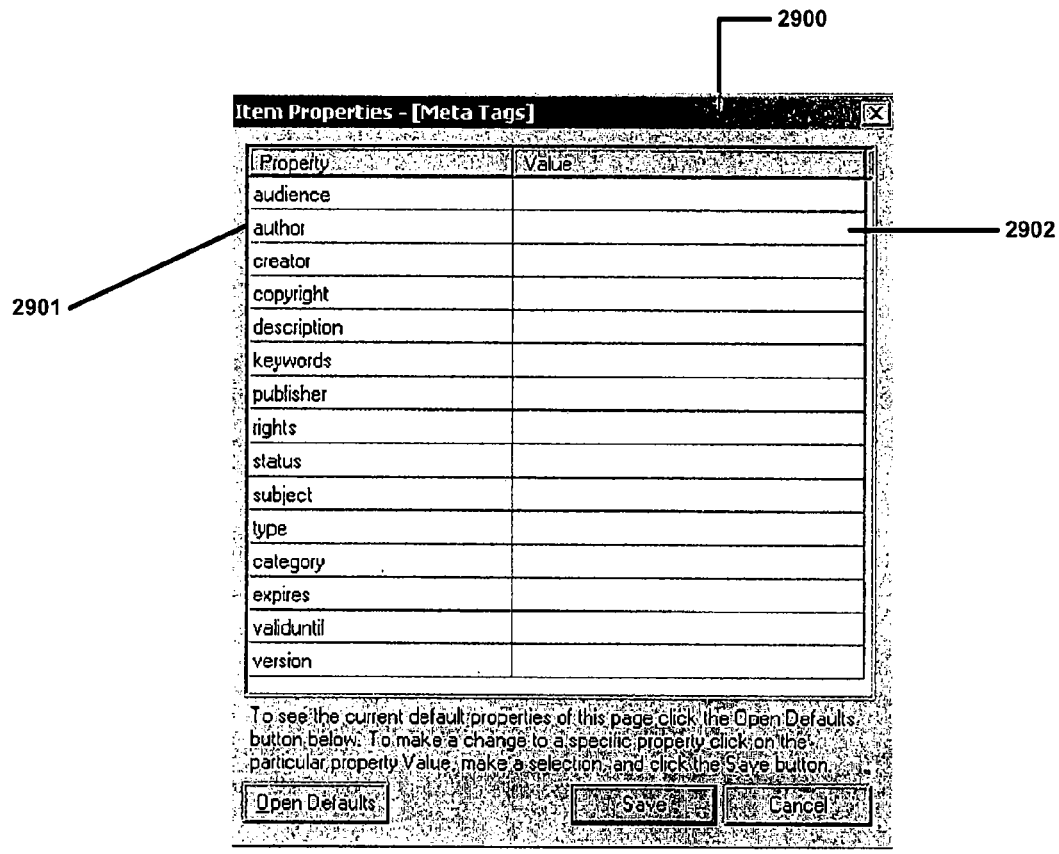
FIG. 29 is an illustration of a metadata interface for us in storing data associated with the components of an embodiment the present invention.

Referring now to FIG. 29, there is illustrated a metadata interface 2900 for use with the present invention. The metadata interface 2900 provides for the entry and storage of information associated with the user interface. For example, the data included in the metadata interface includes "creator," "published," "version" and "audience," data which describes various aspects of the user interface in general. Each of the data in the system, e.g. asset types, topics and sub-topics, can have an associated metadata interface 2900. The metadata interface 2900 includes fields 2901, each of which has a descriptor 2902. The expert author provides information to the descriptor 2902, which in turn describes the fields 2901. Thus, the metadata interface 2900 is used to describe the general user interface at the highest level of abstraction, but is also used to describe each of the pieces of data within the system. This information is customizable and uses industry standard tagging of metadata for description and indexing of one or more assets by a separate search component.

Another aspect of the present invention is a voice-driven user interface, wherein data is provided to the interface by the user in audio form. In response to an inquiry from the system, which can also be in audio form, the user speaks into a microphone and provides the requested data in audio form. The system comprises a voice recognition functionality which recognizes the audio data provided by the user. For example, if the user speaks the word "two" into the system via the microphone, the system recognizes that spoken word as the number two. It will be understood that voice-recognition is not limited to numerical values, but can also encompass words and phrases. The system thereby translates the user-provided audio data into a format that is capable of being processed by the system.

The user interface of the present invention also provides additional enhanced features by which the user can interact with the system. One such feature is a keyword search, which can be made available on any or all of the HTML pages of the interface. Using the keyword search, the user can type a word into a search dialog, and the system uses that word to search the available HTML pages and provide the user with an HTML page and/or other data responsive to the keyword. Another feature is an e-mail hyperlink, which can also be made available on any or all of the HTML pages of the interface. Upon clicking the e-mail hyperlink, the user is presented with an e-mail interface through which the user can send an e-mail to the expert author of the interface. Another feature is the inclusion of an instant messaging hyperlink, which can likewise be made available on any or all of the HTML pages of the interface. Using that hyperlink, the user can send an instant message to the expert author of the interface. Another feature is the inclusion of a "blog hook" hyperlink. By clicking that hyperlink, the user is directed to a weblog interface through which the user can provide comments to a weblog related to the interface. Another functionality of the weblog hyperlink is that upon clicking that hyperlink, the user can add a link and weblog commentary to the user's own weblog, wherein the link and weblog commentary are related to the user interface.

In one embodiment, the data stored by the system—and retrieved for the generation of the user interface—is stored on a host server that is remote from the expert author's computer. The remote storage allows for the generation, storage and maintenance of the user interface irrespective of the expert author's location or the status of the expert author's computer. The remote storage also allows for the expert author to generate and maintain the user interface from any location capable of accessing the host server. The expert author's component can be accessed via a variety of methods, including, but not limited to a standalone web application, an application embedded within a web browser, a web based interface, or an external system utilizing industry standard web service protocols. In one embodiment, the remote storage allows for requests for information using the SOAP and XML protocols to pull data from the internal database.

Figure 30:
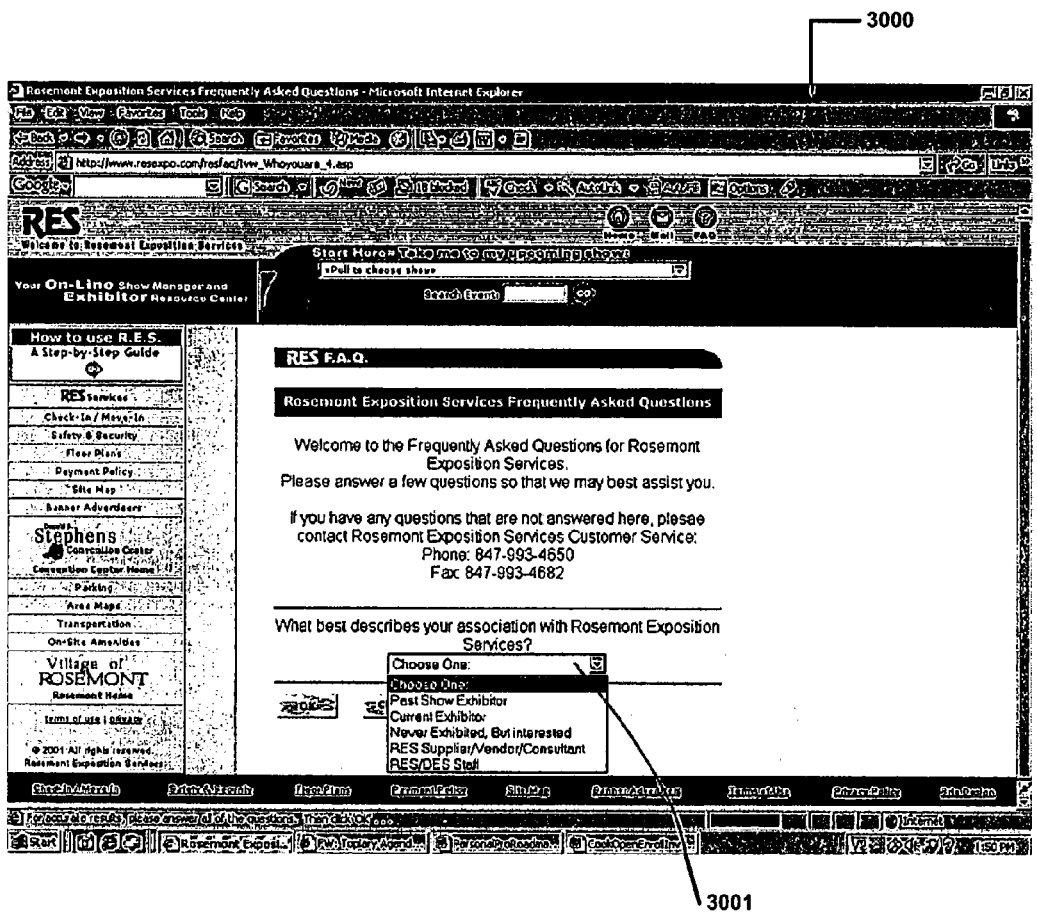
FIG. 30 is a first illustration of a response chain for use with a user interface prepared in accordance with an embodiment of the present invention.
Figure 31:
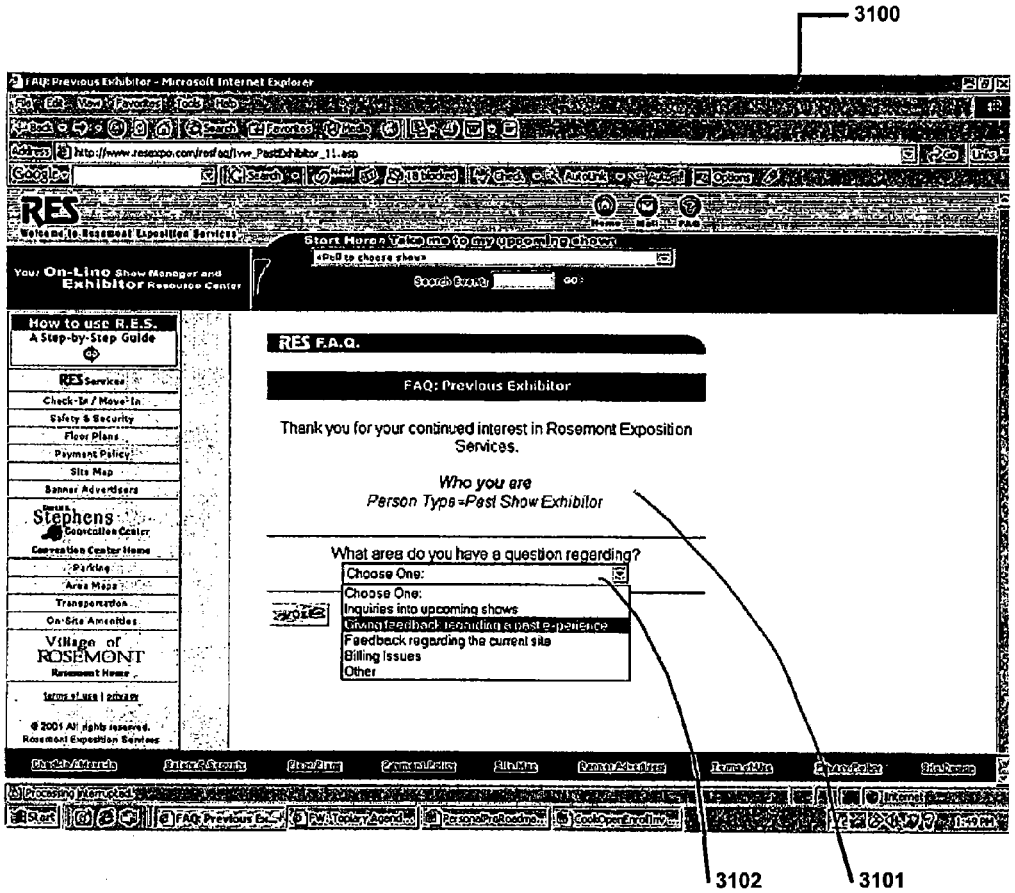
FIG. 31 is a second illustration of a response chain for use with a user interface prepared in accordance with an embodiment of the present invention.

Referring now to FIGS. 30 and 31, there is illustrated a response-chaining functionality of the present invention, wherein the response 3001 to a first question is used to generate answers 3101 to a second question. For instance, and as illustrated in FIG. 30, a first question is asked of a user, and various selectable answers 3001 to that question are provided to the user. The user selects from among the provided selectable answers 3001. Based on the answer selected by the user, and as illustrated in FIG. 31, answers 3102 to a second question are generated. Alternatively, the second question remains static and is not generated based on the selected answer 3001 to the first question; rather, selectable answers to the second question are provided based on the selected answer to the first question. The response(s) can be displayed on the resulting page 3100 to provide the user with visual feedback to ensure that they entered the information accurately to prevent data entry errors from producing inaccurate navigation through the decision tree.

Figure 32:
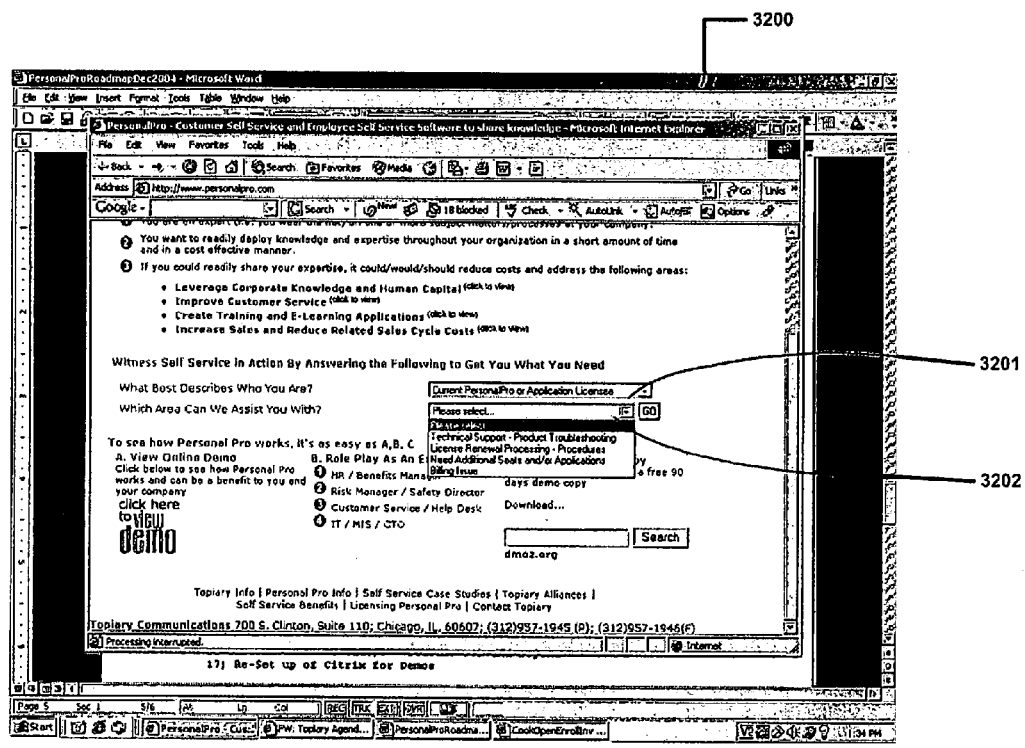
FIG. 32 is an illustration of a user interface with dynamic response population, in accordance with an embodiment of the present invention.

Referring now to FIG. 32, there is illustrated a user interface 3200 comprising the feature of dynamic response population. The user provides an answer 3201 to a question, and based upon that answer 3201, subsequent and/or previous answers 3202 are dynamically answered by the system. Similarly, the system records the answers 3201 to questions and dynamically populates subsequent and/or previous questions based on the answer 3201 to a question. Owing to that functionality, the system does not have to access separate HTML pages in order to provide answers to subsequent questions. Typically, the code necessary to dynamically populate the answer to a question is executed upon the loading of an HTML page. The typical approach to a series of questions is therefore to place each question on its own HTML page, so that any dynamic population of a subsequent question is only performed upon the loading of that HTML page. The present invention provides dynamic generation in the same HTML page, so that a separate page does not need to be accessed. As illustrated in FIG. 32, a first and second question are combined in the same HTML page. Based on the answer 3201 to the first question, the answer 3202 to the second question is dynamically populated by the system within accessing a separate HTML page. A related functionality of the present system is to dynamically populate selectable answers 3202 to the second question, instead of the answer itself. In other words, selectable answers 3202 to the second question are based on the answer 3201 to the first question, wherein both questions—including the dynamically populated selectable list of answers to the second question—are contained within the same HTML page.

Figure 33:
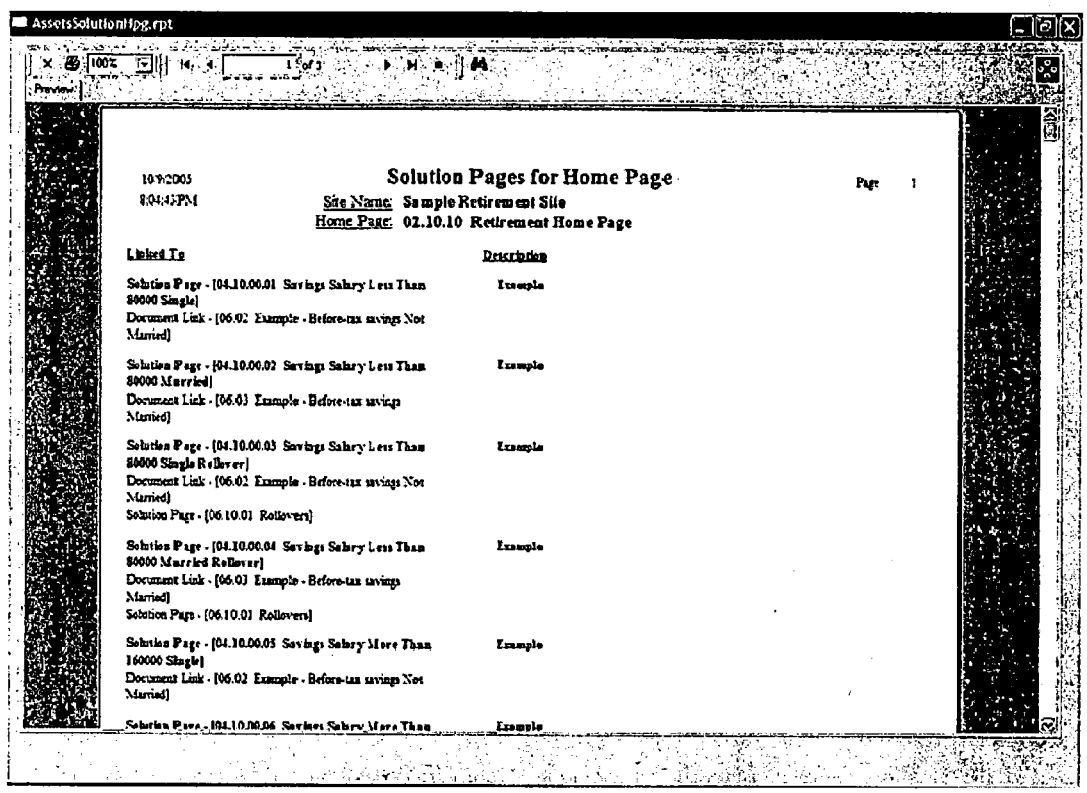
FIG. 33 is a solution page portion of automatically generated documentation for a user interface prepared in accordance with an embodiment of the present invention.
Figure 34:
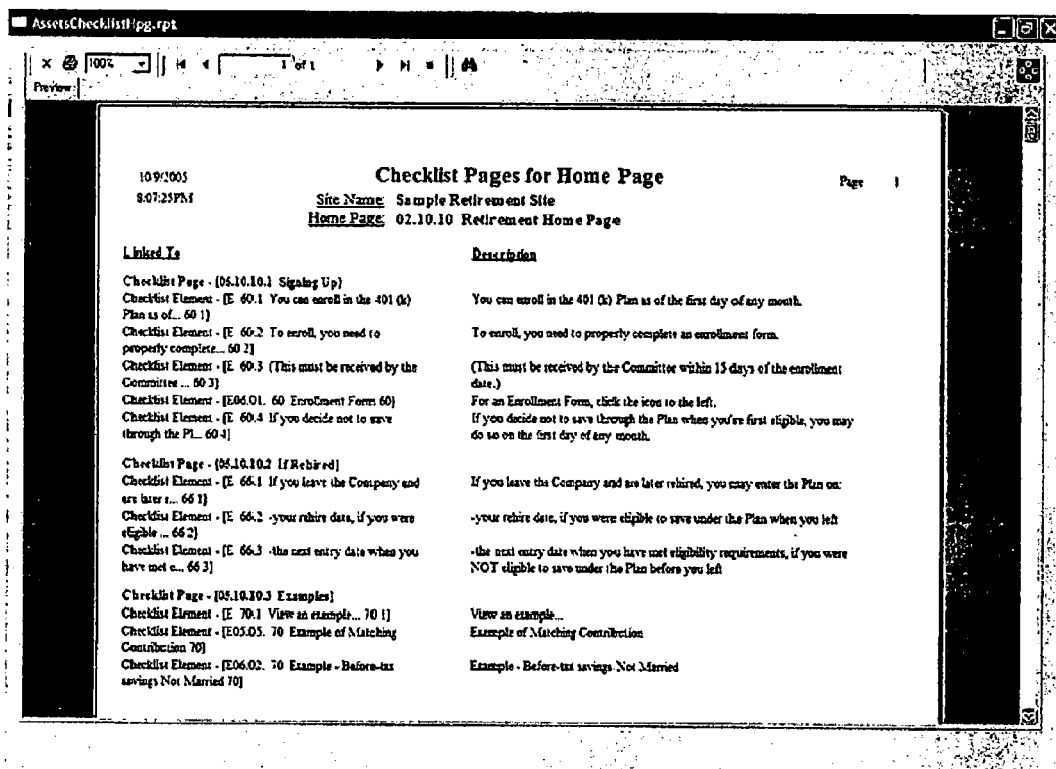
FIG. 34 is a checklist page portion of automatically generated documentation for a user interface prepared in accordance with an embodiment of the present invention.
Figure 35:
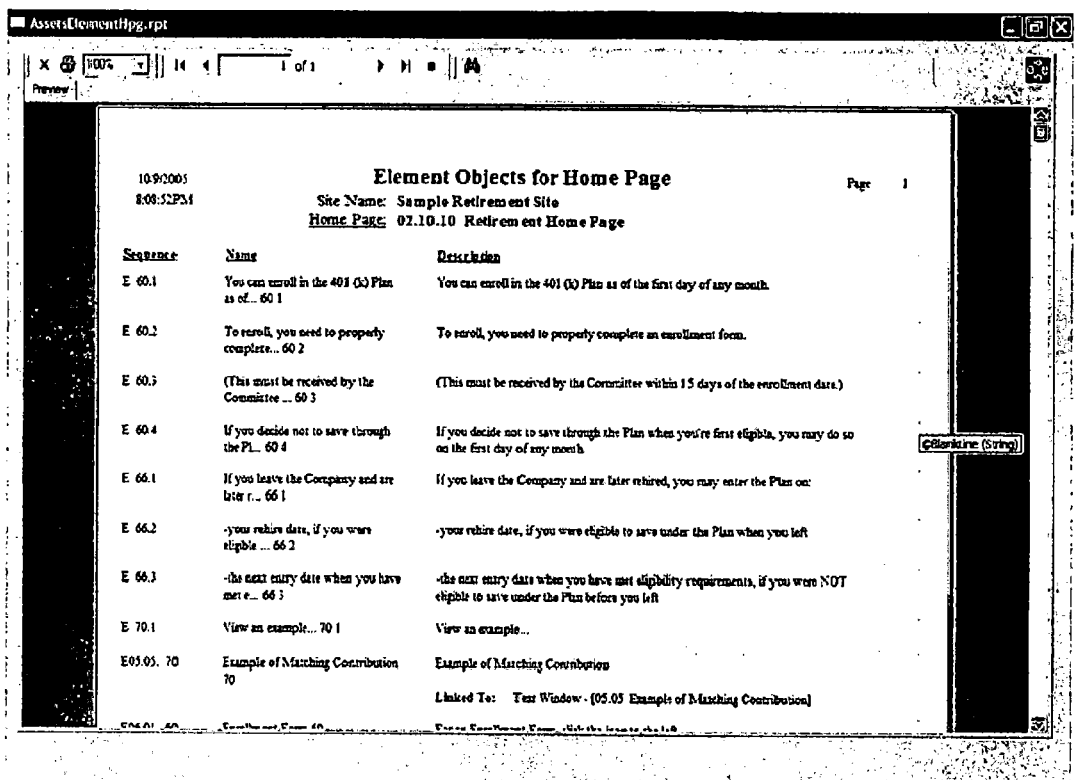
FIG. 35 is a element objects list portion of automatically generated documentation for a user interface prepared in accordance with an embodiment of the present invention.

Referring now to FIGS. 33 through 42, there are illustrated reports 3300-4200 that are automatically generated by the present invention. The reports indicate and represent the authoring process, and are generated dynamically based on the rules, logic and text provided by the expert author. In that way, the reports form an automatic documentation for use in understanding and maintaining the created user interface. Referring specifically to FIG. 33, an automatically generated solution page 3300 is illustrated, wherein the report illustrates and reflects the linkages and relationships between the asset values reflected on an HTML page of the user interface. Referring specifically to FIG. 34, an automatically generated checklist page 3400 is illustrated, wherein the linkages and relationships between HTML pages of the user interface are represented and verified. Referring specifically to FIG. 35, an automatically generated element objects list 3500 is illustrated, which illustrates and reflects all of the elements and objects embodied in an HTML page of the user interface.

Figure 36:
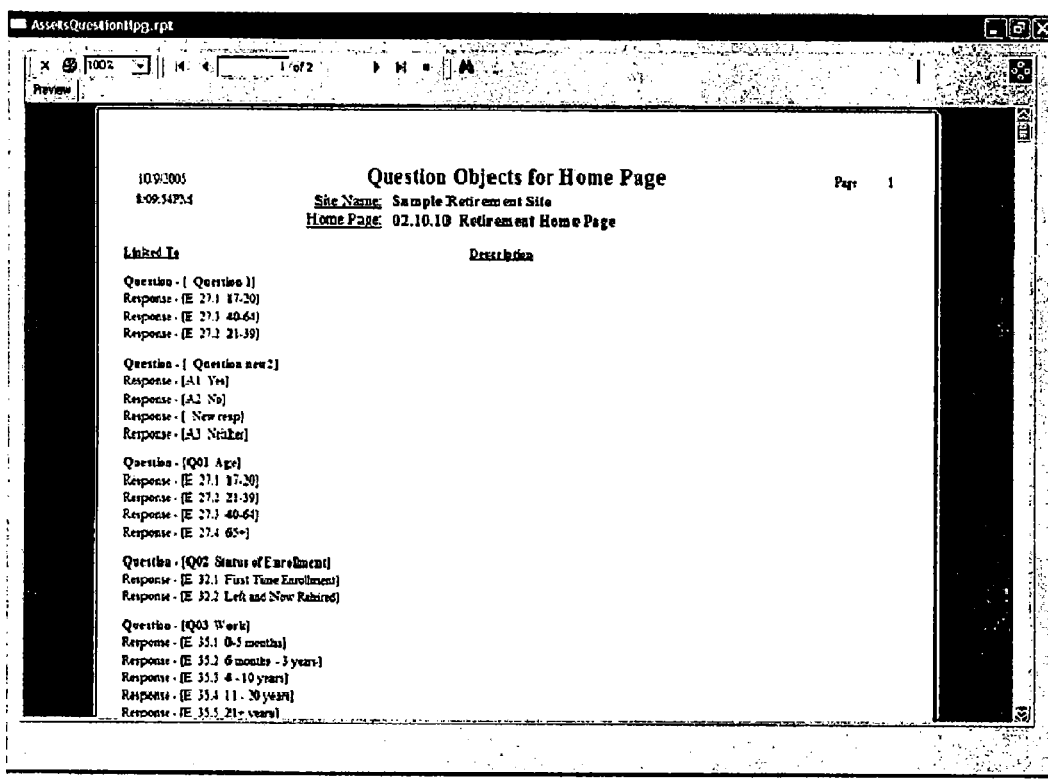
FIG. 36 is a question object list portion of automatically generated documentation for a user interface prepared in accordance with an embodiment of the present invention.
Figure 38:
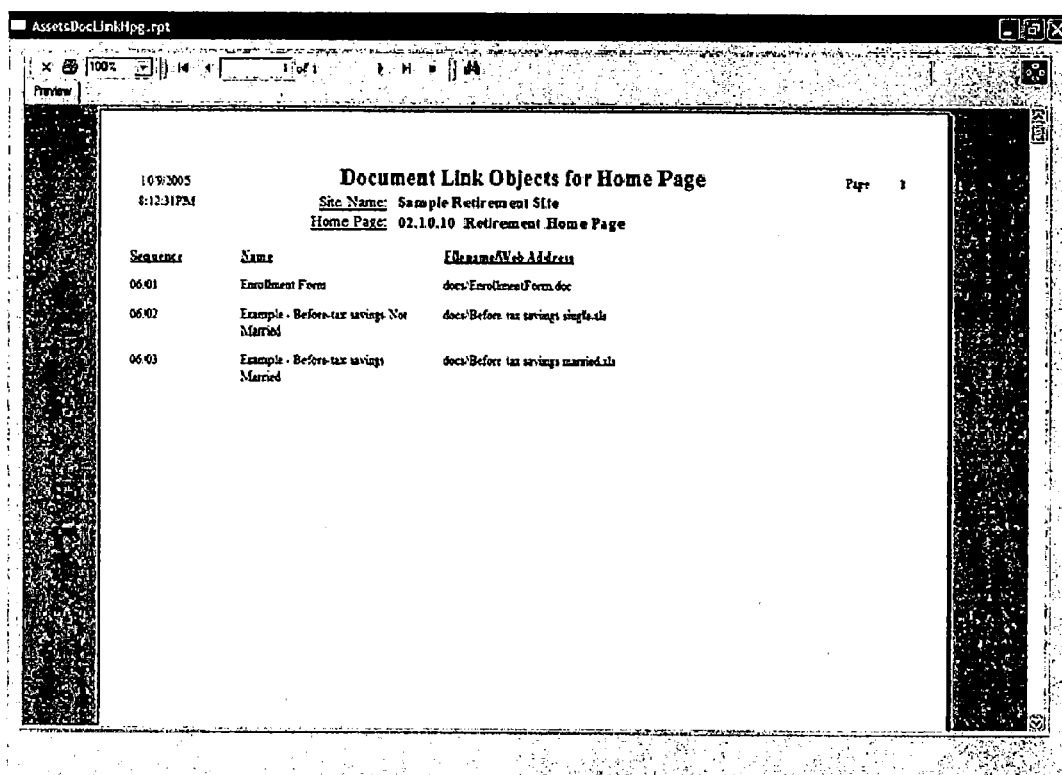
FIG. 38 is a document link object list portion of automatically generated documentation for a user interface prepared in accordance with an embodiment of the present invention.
Figure 39:
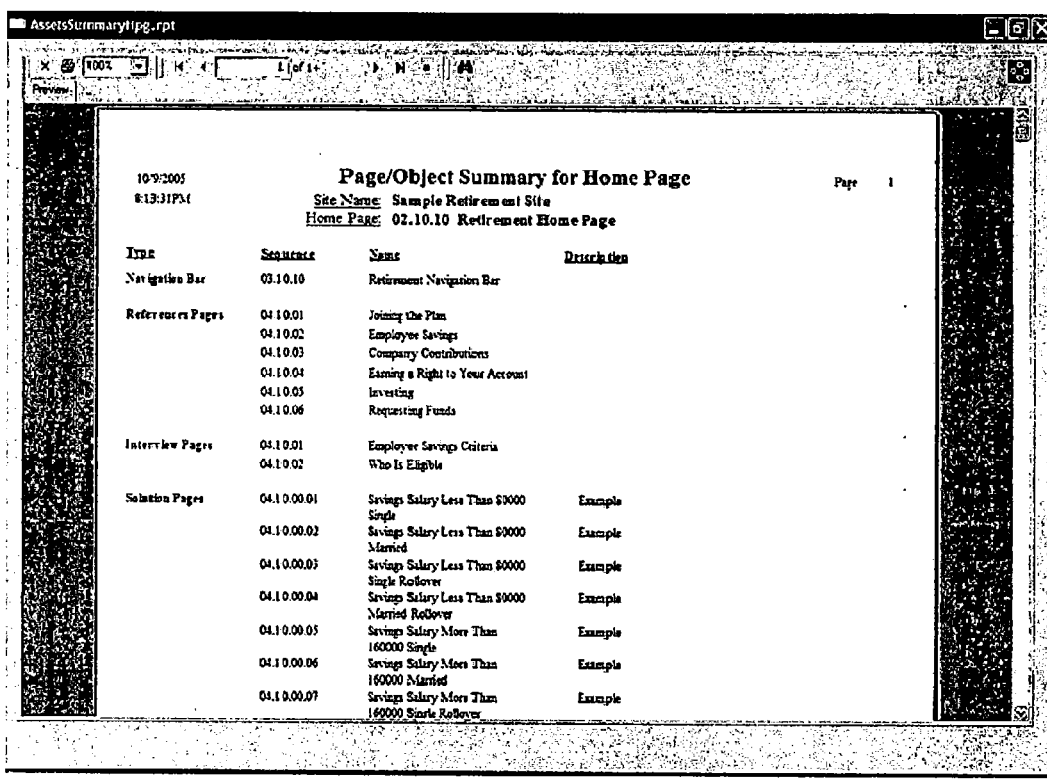
FIG. 39 is a page/object summary list portion of automatically generated documentation for a user interface prepared in accordance with an embodiment of the present invention.

Referring specifically to FIG. 36, there is illustrated a question object list 3600, wherein the question-type objects embodied in an HTML page of the user interface are illustrated and described. Referring specifically to FIG. 37, there is illustrated a rules object list 3700, wherein the rules-type objects embodied in an HTML page (i.e., the rules upon which the questions are asked, and selectable answers to questions are provided) are listed. Referring specifically to FIG. 38, there is illustrated a document link object list 3800, which illustrates the documents and descriptions thereof that are linked to form an individual HTML page of the user interface. Referring specifically to FIG. 39, there is illustrated a page/object summary list 3900, which lists and illustrates the objects embedded in an HTML page of the user interface.

Figure 40:
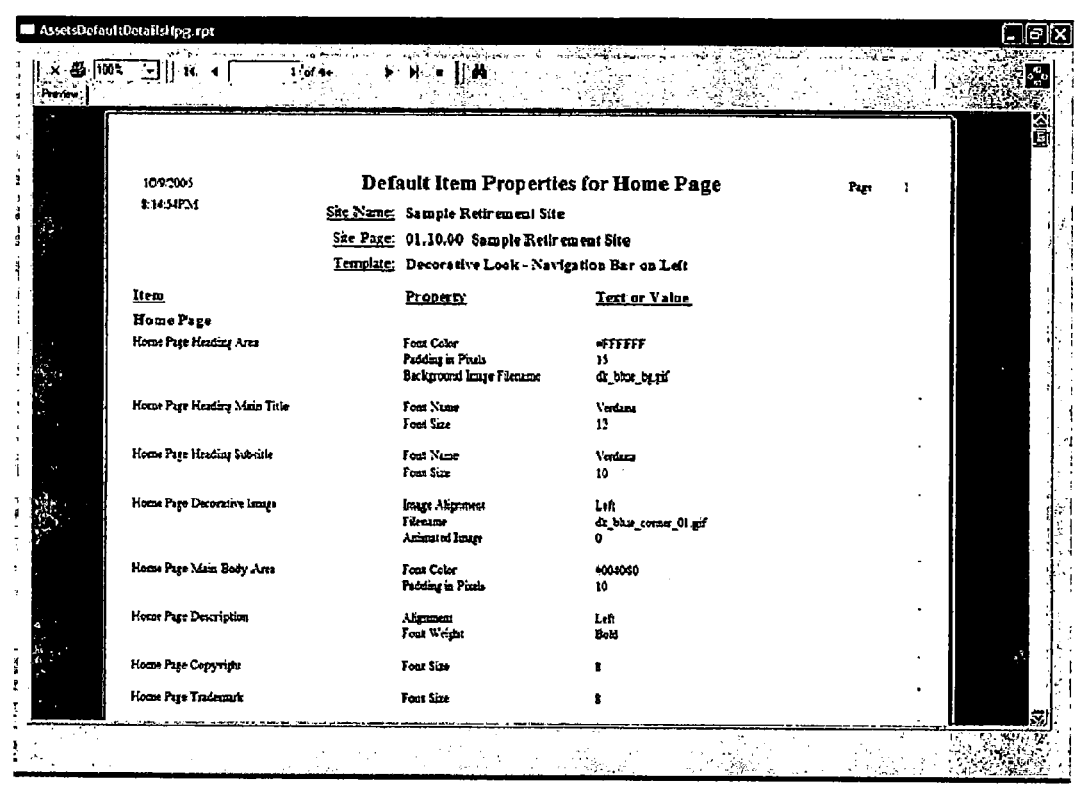
Figure 41:
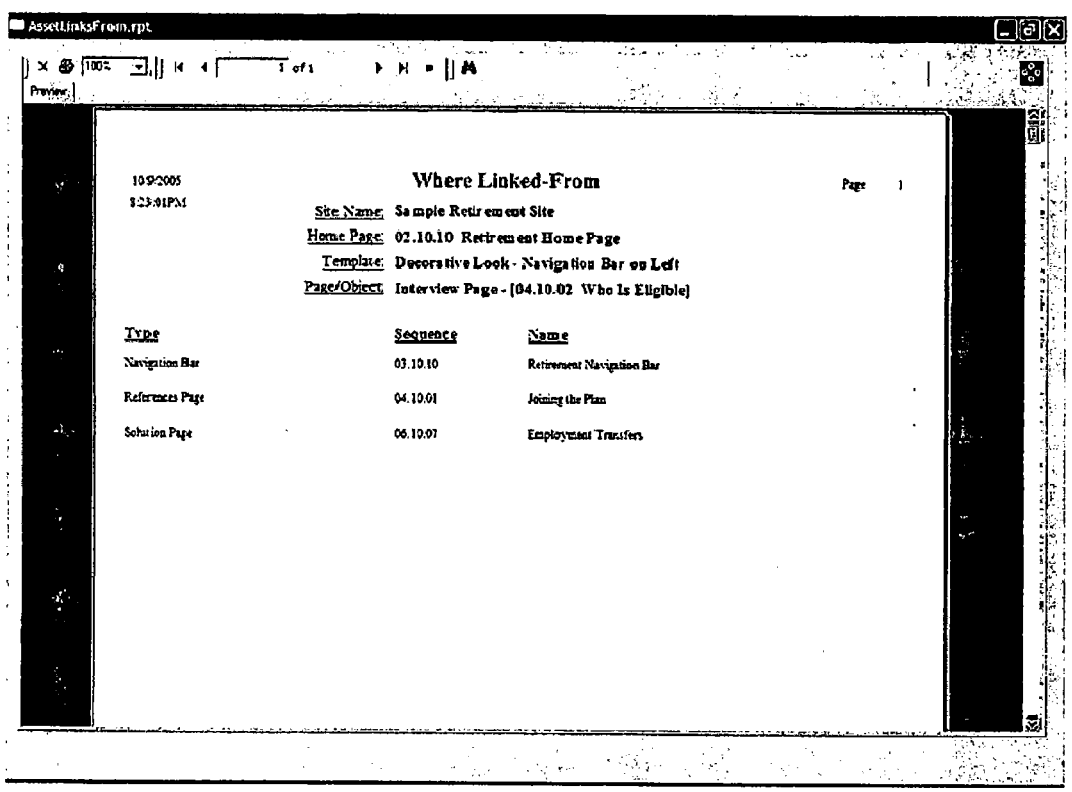
FIG. 41 is a linkage map portion of automatically generated documentation for a user interface prepared in accordance with an embodiment of the present invention.

Referring specifically to FIG. 40, there is illustrated a default item properties list 4000, which lists the properties and values associated with each object embedded in an HTML page of the user interface. Referring specifically to FIG. 41, there is illustrated a linkage map 4100, which illustrates the linkages and mapping between individual ones of the HTML pages of the user interface. Referring specifically to FIG. 42, there is illustrated a rules chart 4200, which illustrates the rules and linkages for the questions embedded in the user interface. The rules chart 4200 can, as illustrated in FIG. 42, also be made available to the user of the system and/or the expert author for use in quickly navigating the user interface without proceeding through the separate HTML pages of the interface.

Figure 43:
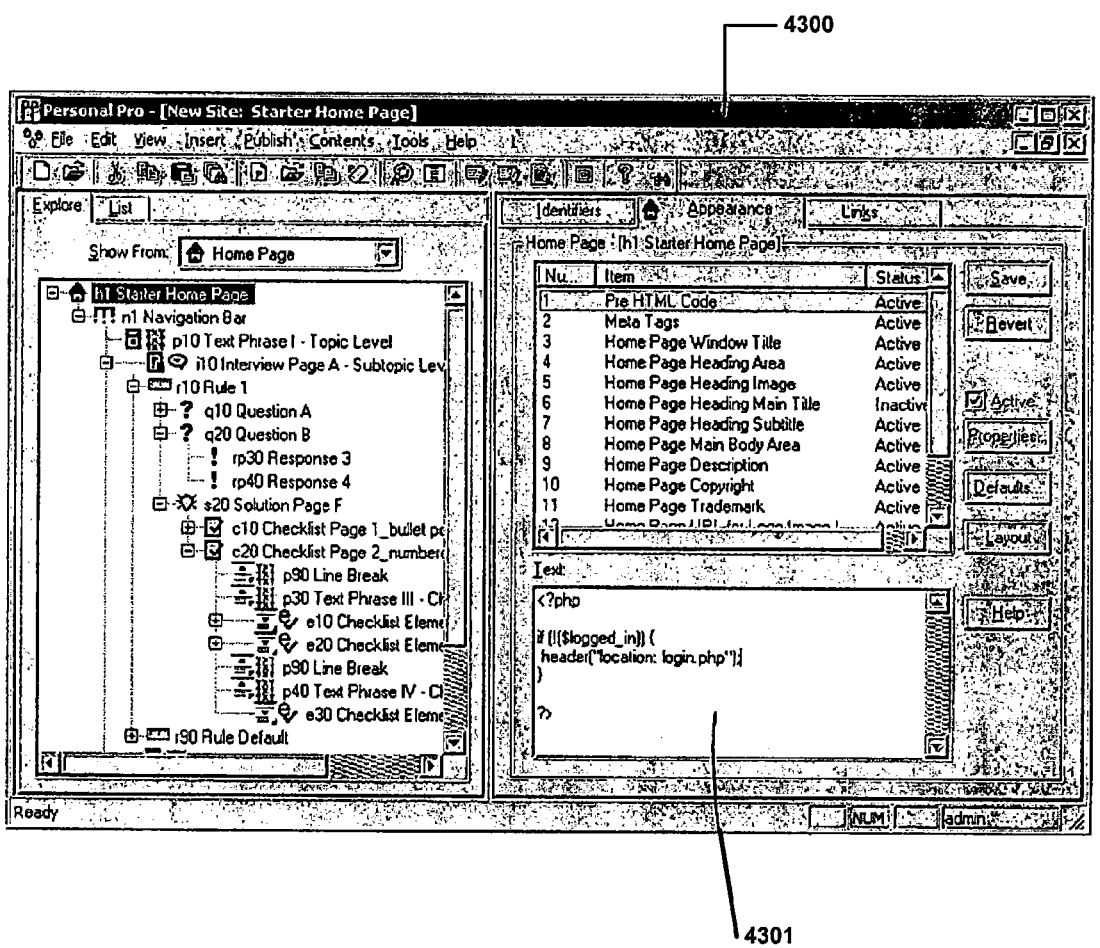
FIG. 43 is an illustration of a coding window for use in creating and maintaining a user interface in accordance with an embodiment of the present invention.

Referring now to FIG. 43, there is illustrated a coding window 4300 for use with the present invention. When maintaining, updating or designing the user interface, the expert author has the ability to add specific HTML code to the dynamically-generated user interface HTML page. It will be understood that the present invention is capable of being served on a variety of different computing platforms and is compatible with a variety of different Internet browsers and Internet environments. The present invention is capable of existing within and interacting with those environments. To facilitate the interaction between the user interface of the present invention and those environments, one aspect of the present invention is a "Pre HTML Code" field 4301, which exists in the database as previously described. For any or all of the pages of the user interface, the expert author can manually add HTML code, which will be dynamically generated by the software of the present invention when that HTML page is loaded into a browser. For example, and as illustrated, if the expert author wishes the dynamically generated page to include a login script that is part of an environment external to the user interface of the present invention, the expert author can add the HTML code for that login script to the "Pre HTML Code" field 4301 as illustrated. Then, when that HTML page or pages of the user interface is requested from the database, the HTML code entered by the expert author will be directed to the browser. It will be further understood that the HTML code provided by the expert author need not be provided to the browser before the remainder of the dynamically generated user interface, but may also be provided to the browser at any point during the loading of the page, and that the portion of the page in which the HTML code is loaded is also capable of being specified by the expert author.

Figure 44:
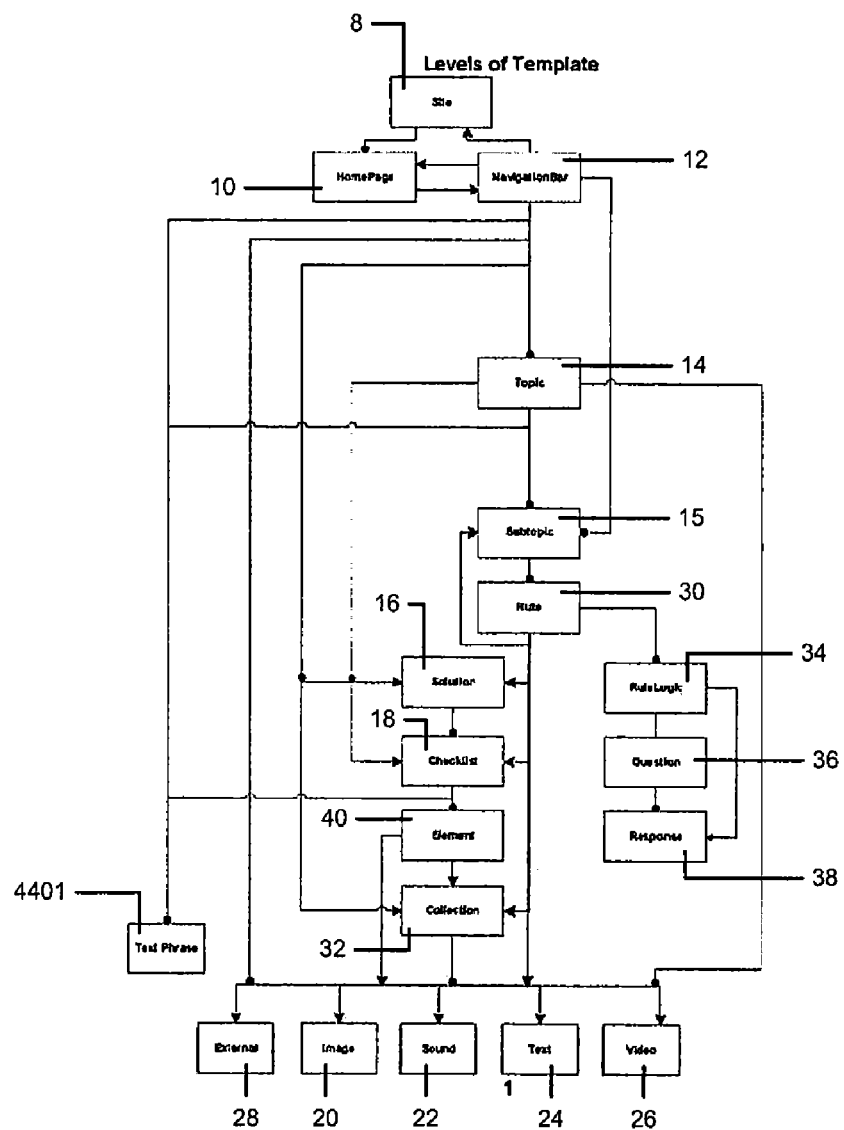
FIG. 44 is a flowchart of a template for a user interface prepared in accordance with an embodiment of the present invention.

Referring now to FIG. 44, there is illustrated a flowchart for a template prepared in accordance with an embodiment of the present invention. The user interface of the present invention is organized into topics and subtopics. Each topic can have more than one subtopic, and both topics and subtopics have associated questions, responses and associated logic for determining both the order of the questions and the answers to the questions. Each HTML page also has the capability for embedded material such as text, video, sounds and images. When a page is dynamically generated from the database, the topic, subtopic, question, answer, logic and embedded materials are drawn from the database according to the preferences specified by the expert author of the user interface. That data is embedded within a template, which is also specified by the expert author. A template retrieves information contained within the database about each asset and control in the database and places it in the appropriate location for the preferred output display format. A template maintains location to utilize information stored in the database of inputs from the expert through the GUI and allows definitions of text, colors, alignment, and styles. By utilizing a system of templates, the end code generated by the application can output to current standards such as HTML, Javascript, XML, and dynamic scripting languages as well as allowing flexibility to generate for future standards and alternate non-standardized display methods. Every portion of the template is customizable, and the authoring interface provided for herein allows the expert author to design the user interface using either a top-down, bottom-up or sideways approach. In a top-down approach, the user interface is designed such that data from the database is embedded within the template automatically, and the template is used by default as a package into which data from the database is embedded. In a bottom-up approach, each portion of data in the database has an associated design template, and therefore each portion of the user interface has a separate and dynamically generated design. In a sideways approach, a master template is used as a template for all of the pages of the user interface except a select few, for which a specific template is provided that overrides the master template. Further, any combination of the approaches can be used in the creation and maintenance of the user interface. For example, a top-down approach can be used to design the interface, but later, a bottom-up or sideways approach can be used to maintain or update a portion of the interface. The template interface also includes a text phrase element 4401 that can be used in any of the approaches as described herein.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

While the specific embodiments have been illustrated and described, numerous modifications come to mind without significantly departing from the spirit of the invention, and the scope of protection is only limited by the scope of the accompanying claims.

What is claimed is:

1. A method of authoring and generating a compliance application having a plurality of pages viewable with an interface, the compliance application for interacting with a user to find a solution to a problem through the user answering a series of questions and/or following a series of steps, the method comprising the steps of:

providing for receiving a first question, a second question, and a third question from an expert through an editor;

providing for receiving a first potential answer to the first question and a second potential answer to the first question from the expert through the editor, wherein both the first and second potential answers to the first question are correct answers to the first question, and wherein the first and second answers are utilized to create a compliance path;

providing for receiving a first potential answer to the second question and a second potential answer to the second question from the expert through the editor, wherein both the first and second potential answers to the second question are correct answers to the second question, and wherein the first and second answers are utilized to create the compliance path;

providing for receiving a solution to the problem from the expert through the editor, the solution being an answer and/or a step for the user to follow for use in the compliance application;

providing for receiving a first Boolean logic rule from the expert through the editor, the first Boolean logic rule associating the first potential answer to the first question, the first potential answer to the second question, and the third question, the first Boolean logic rule being utilized within the compliance application for directing the user through the compliance path for complying with the compliance application;

providing for receiving a second Boolean logic rule from the expert through the editor, the second Boolean logic rule associating the first potential answer to the first question, the second potential answer to the second question, and the solution, the second Boolean logic rule being utilized within the compliance application for directing the user through the compliance path for complying with the compliance application; and, providing for generating the plurality of pages based on the first question, the second question, the third question, the first potential answer to the first question, the second potential answer to the first question, the first potential answer to the second question, the second potential answer to the second question, the first Boolean logic rule, the second Boolean logic rule, and the solution.

2. The method of claim 1, wherein after the compliance application is generated, further comprising the steps of:

providing for transmitting a first page of the plurality of pages to the user, the first page displaying the first question to the user;

providing for receiving a first response from the user, wherein the first response is indicative of one of the first potential answer to the first question and the second potential answer to the first question, wherein at least one of the first and second potential answers to the first question will match the first response and lead to a further step within the compliance path or to the solution within the compliance path;

providing for transmitting a second page of the plurality of pages to the user, the second page displaying the second question to the user as a part of the further step within the compliance path;

providing for receiving a second response from the user, wherein the second response is indicative of one of the first potential answer to the second question and the second potential answer to the second question, and wherein at least one of the first and second potential answers to the second question will match the second response and lead to a further step within the compliance path or to the solution within the compliance path;

providing for executing at least one of the first Boolean logic rule to produce a first rule result which is indicative of the next step in the compliance path, and the second Boolean logic rule to produce a second rule result, which may also be indicative of the next step in the compliance path or may be indicative of the even further step within the compliance path; and providing for transmitting a third page to the user, the third page displaying the third question to the user if the first rule result is positive as the next step in the compliance path, the second page displaying the further step in the compliance path or the solution to the user if the second rule result is positive.

3. A method as defined in claim 1, further comprising automatically publishing the plurality of pages to a server connected to the Internet.

4. A method as defined in claim 1, wherein one or more of the first question, the second question, the third question, the first potential answer to the first question, the second potential answer to the first question, the first potential answer to the second question, the second potential answer to the second question, the first Boolean logic rule, the second Boolean logic rule, and/or the solution is received in free form text format, and wherein the method further comprises the step of:

automatically adding XML keywords to the freeform text format for generating the plurality of pages.

5. A method as defined in claim 1, wherein generating the plurality of pages comprises generating JavaScript.

6. A method as defined in claim 5, wherein generating the plurality of pages comprises generating cascading style sheets.

7. A method as defined in claim 1, wherein generating the plurality of pages comprises using a template.

8. A method as defined in claim 7, wherein the template is selected from a plurality of templates and dynamically generated using one or more of the first question, the second question, the third question, the first potential answer to the first question, the second potential answer to the first question, the first potential answer to the second question, the second potential answer to the second question, the first Boolean logic rule, the second Boolean logic rule, and/or the solution.

9. A method as defined in claim 1, wherein one or more of the first question, the second question, the third question, the first potential answer to the first question, the second potential answer to the first question, the first potential answer to the second question, the second potential answer to the second question, the first Boolean logic rule, the second Boolean logic rule, and/or the solution can be imported and used to generate a second compliance application.

10. A method as defined in claim 1, wherein one or more of the first question, the second question, the third question, the first potential answer to the first question, the second potential answer to the first question, the first potential answer to the second question, the second potential answer to the second question, the first Boolean logic rule, the second Boolean logic rule, and/or the solution are received and stored through an outline within the editor.

11. A method as defined by claim 1, wherein one or more of the first question, the second question, the third question, the first potential answer to the first question, the second potential answer to the first question, the first potential answer to the second question, the second potential answer to the second question, the first Boolean logic rule, the second Boolean logic rule, and/or the solution are received from a standard word processing file created by a standard word processing software application.

12. An apparatus structured to facilitate authoring and generating a compliance application having a plurality of pages viewable with an interface, the compliance application for interacting with a user to find a solution to a problem through the user answering a series of questions and/or following a series of steps, the apparatus being structured to:

receive a first question, a second question, and a third question from an expert through an editor;

receive a first potential answer to the first question and a second potential answer to the first question from the expert through the editor, wherein both the first and second potential answers to the first question are correct answers to the first question, and wherein the first and second answers are utilized to create a compliance path;

receive a first potential answer to the second question and a second potential answer to the second question from the expert through the editor, wherein both the first and second potential answers to the second question are correct answers to the second question, and wherein the first and second answers are utilized to create the compliance path;

receive a solution to the problem from the expert through the editor, the solution being an answer and/or a step for the user to follow for use in the compliance application;

receive a first Boolean logic rule from the expert through the editor, the first Boolean logic rule associating the first potential answer to the first question, the first potential answer to the second question, and the third question, the first Boolean logic rule being utilized by the compliance system for directing the user through the compliance path for complying with the compliance application;

receive a second Boolean logic rule from the expert through the editor, the second Boolean logic rule associating the first potential answer to the first question, the second potential answer to the second question, and the solution, the second Boolean logic rule being utilized within the compliance application for directing the user through the compliance path for complying with the compliance application; and, generate the plurality of pages based on the first question, the second question, the third question, the first potential answer to the first question, the second potential answer to the first question, the first potential answer to the second question, the second potential answer to the second question, the first Boolean logic rule, the second Boolean logic rule, and the solution.

13. The apparatus of claim 12, wherein after the compliance application is generated, the compliance application is structured to:

transmit a first page of the plurality of pages to the user, the first page displaying the first question to the user;

receive a first response from the user, wherein the first response is indicative of one of the first potential answer to the first question and the second potential answer to the first question, wherein at least one of the first and second potential answers to the first question will match the first response and lead to a further step within the compliance path or to the solution within the compliance path;

transmit a second page of the plurality of pages to the user, the second page displaying the second question to the user as a part of the further step within the compliance path;

receive a second response from the user, wherein the second response is indicative of one of the first potential answer to the second question and the second potential answer to the second question, wherein at least one of the first and second potential answers to the second question will match the second response and lead to a further step within the compliance path or to the solution within the compliance path;

execute at least one of the first Boolean logic rule to produce a first rule result which is indicative of the next step in the compliance path, and the second Boolean logic rule to produce a second rule result, which may also be indicative of the next step in the compliance path or may be indicative of the even further step within the compliance path; and transmit a third page to the user, the third page displaying the third question to the user if the first rule result is positive as the next step in the compliance path, the second page displaying the further step in the compliance path or the solution to the user if the second rule result is positive.

14. An apparatus as defined in claim 13, further structured to automatically publish the plurality of pages to a server connected to the Internet.

15. An apparatus as defined in claim 13, further structured to generate the plurality of pages as HTML files.

16. An apparatus as defined in claim 15, further structured to include JavaScript in the HTML files.

17. An apparatus as defined in claim 16, further structured to generate the plurality of pages with cascading style sheets.

18. An apparatus as defined in claim 13, further structured to generate the plurality of pages using a template.

19. An apparatus as defined in claim 18, wherein the template includes source code.

20. An apparatus as defined in claim 13, wherein the solution comprises text.

* * * * *